United States Patent
Agnihotri et al.

(10) Patent No.: US 11,856,548 B2
(45) Date of Patent: Dec. 26, 2023

(54) LOCATION SUPPORT FOR INTEGRATED ACCESS AND BACKHAUL NODES

(71) Applicant: QUALCOMM Incorporated, San Diego, CA (US)

(72) Inventors: Hem Agnihotri, Benares (IN); Stephen William Edge, Escondido, CA (US); Bapineedu Chowdary Gummadi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 17/223,978

(22) Filed: Apr. 6, 2021

(65) Prior Publication Data
US 2022/0322273 A1 Oct. 6, 2022

(51) Int. Cl.
*H04W 64/00* (2009.01)
*H04W 48/16* (2009.01)

(52) U.S. Cl.
CPC .......... *H04W 64/00* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 9,998,854 B2 | 6/2018 | Gao et al. | |
| 2021/0044958 A1 | 2/2021 | Abedini et al. | |
| 2022/0007275 A1* | 1/2022 | Li ........................ | H04W 72/21 |
| 2022/0201679 A1* | 6/2022 | Lim ..................... | H04W 72/23 |

FOREIGN PATENT DOCUMENTS

WO 2020107411 A1 6/2020

OTHER PUBLICATIONS

Ericsson: "How to Support Positioning in F1AP", 3GPP TGG-RAN WG3 #103, 3GPP Draft, R3-190747, 3rd Generation Partnership Project (3GPP), Mobile Competence Centre, 650, Route Des Lucioles, F-06921 Sophia-Antipolis Cedex, France, vol. RAN WG3, No. Athens, Greece, Feb. 25, 2019-Mar. 1, 2019, Feb. 16, 2019 (Feb. 16, 2019), 5 Pages, XP051604682, Retrieved from the Internet: URL: https://www.3gpp.org/ftp/TSG_RAN/WG3_lu/TSGR3_103/Docs/R3-190747.zip, [retrieved on Feb. 16, 2019], The whole document.
International Search Report and Written Opinion—PCT/US2022/013901—ISA/EPO—dated Apr. 20, 2022.

* cited by examiner

*Primary Examiner* — Suhail Khan
(74) *Attorney, Agent, or Firm* — Thien T. Nguyen

(57) ABSTRACT

Disclosed are techniques for communication. In an aspect, a first network entity receives an integrated access and backhaul (IAB) node information message from a second network entity, the IAB node information message including one or more parameters for at least one transmission-reception point (TRP) of a base station, wherein the at least one TRP corresponds to an IAB node, and wherein the one or more parameters are related to the at least one TRP corresponding to the IAB node, and performs one or more positioning operations based on the one or more parameters to locate a target user equipment (UE) engaged in a positioning session with a location server.

30 Claims, 13 Drawing Sheets

LOCATION SUPPORT FOR INTEGRATED ACCESS AND BACKHAUL NODES

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

To efficiently improve wireless coverage of 5G networks, integrated access and backhaul (IAB) support can be used in a Next Generation radio access network (NG-RAN) for a 5G network. In that case, location services supported by a 5G network, such as provision of navigation for wireless users or location of a device making an emergency call, may benefit from solutions that are adapted to IAB as opposed to solutions that make no allowance for IAB.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a first network entity includes a memory; a communication interface; and at least one processor communicatively coupled to the memory and the communication interface, the at least one processor configured to: receive, via the communication interface, an integrated access and backhaul (IAB) node information message from a second network entity, the IAB node information message including one or more parameters for at least one transmission-reception point (TRP) of a base station, wherein the at least one TRP corresponds to an IAB node, and wherein the one or more parameters are related to the at least one TRP corresponding to the IAB node; and perform one or more positioning operations based on the one or more parameters to locate a target user equipment (UE) engaged in a positioning session with a location server.

In an aspect, a base station includes a memory; communication interface; and at least one processor communicatively coupled to the memory and the communication interface, the at least one processor configured to: receive, via the communication interface, a transmission-reception point (TRP) information request from a location server; and cause the communication interface to transmit a TRP information response message to the location server in response to reception of the TRP information request, the TRP information response message including one or more parameters for at least one TRP of the base station, wherein the at least one TRP corresponds to an integrated access and backhaul (IAB) node, and wherein the one or more parameters are related to the at least one TRP corresponding to the IAB node.

In an aspect, a method of communication performed by a first network entity includes receiving an integrated access and backhaul (IAB) node information message from a second network entity, the IAB node information message including one or more parameters for at least one transmission-reception point (TRP) of a base station, wherein the at least one TRP corresponds to an IAB node, and wherein the one or more parameters are related to the at least one TRP corresponding to the IAB node; and performing one or more positioning operations based on the one or more parameters to locate a target user equipment (UE) engaged in a positioning session with a location server.

In an aspect, a method of communication performed by a base station includes receiving a transmission-reception point (TRP) information request from a location server; and transmitting a TRP information response message to the location server in response to reception of the TRP information request, the TRP information response message including one or more parameters for at least one TRP of the base station, wherein the at least one TRP corresponds to an integrated access and backhaul (IAB) node, and wherein the one or more parameters are related to the at least one TRP corresponding to the IAB node.

In an aspect, a first network entity includes means for receiving an integrated access and backhaul (IAB) node information message from a second network entity, the IAB node information message including one or more parameters for at least one transmission-reception point (TRP) of a base station, wherein the at least one TRP corresponds to an IAB node, and wherein the one or more parameters are related to the at least one TRP corresponding to the IAB node; and means for performing one or more positioning operations based on the one or more parameters to locate a target user equipment (UE) engaged in a positioning session with a location server.

In an aspect, a base station includes means for receiving a transmission-reception point (TRP) information request from a location server; and means for transmitting a TRP information response message to the location server in response to reception of the TRP information request, the TRP information response message including one or more parameters for at least one TRP of the base station, wherein the at least one TRP corresponds to an integrated access and backhaul (IAB) node, and wherein the one or more parameters are related to the at least one TRP corresponding to the IAB node.

In an aspect, a non-transitory computer-readable medium stores computer-executable instructions that, when executed by a first network entity, cause the first network entity to: receive an integrated access and backhaul (IAB) node information message from a second network entity, the IAB node information message including one or more parameters for at least one transmission-reception point (TRP) of a base station, wherein the at least one TRP corresponds to an IAB node, and wherein the one or more parameters are related to the at least one TRP corresponding to the IAB node; and perform one or more positioning operations based on the one or more parameters to locate a target user equipment (UE) engaged in a positioning session with a location server.

In an aspect, a non-transitory computer-readable medium stores computer-executable instructions that, when executed by a base station, cause the base station to: receive a transmission-reception point (TRP) information request from a location server; and transmit a TRP information response message to the location server in response to reception of the TRP information request, the TRP information response message including one or more parameters for at least one TRP of the base station, wherein the at least one TRP corresponds to an integrated access and backhaul (IAB) node, and wherein the one or more parameters are related to the at least one TRP corresponding to the IAB node.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
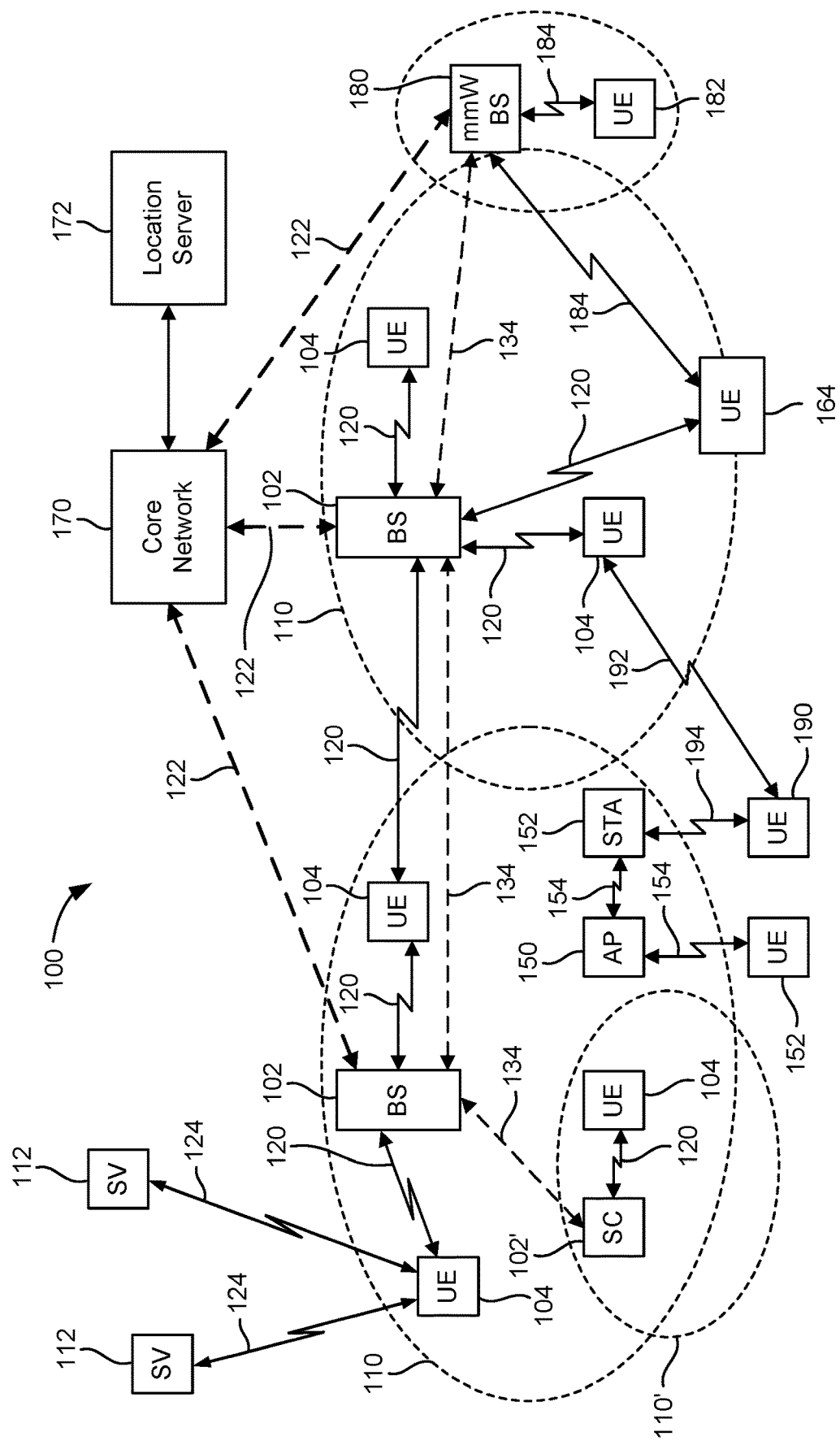
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. A TRP may support transmission of wireless signals (and may then be referred to as a transmission point (TP)), reception of wireless signals (and may then be referred to as a reception point (RP)), or both transmission and reception of wireless signals. A TRP may typically include one or more antennas and processing, storage, and transceiver capability to generate signals for transmission and/or measure signals following reception. A TRP may correspond to, or be part of, a distributed unit (DU, also referred to as gNB-DU) in a gNB that uses a split architecture, e.g., as defined in 3GPP Technical Specification (TS) 38.401. For example, where the term "base station" refers to a single physical TRP, the physical TRP may include an antenna of the base station corresponding to a cell (or several cell sectors) of the base station. Where the term "base station" refers to multiple co-located physical TRPs, the physical TRPs may include an array of antennas (e.g., as in a multiple-input multiple-output (MIMO) system or where the base station employs beamforming) of the base station. Where the term "base station" refers to multiple non-co-located physical TRPs, the physical TRPs may include a distributed antenna system (DAS) (a network of spatially separated antennas connected to a common source via a transport medium) or a remote radio head (RRH) (a remote base station connected to a serving base station). Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB- IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
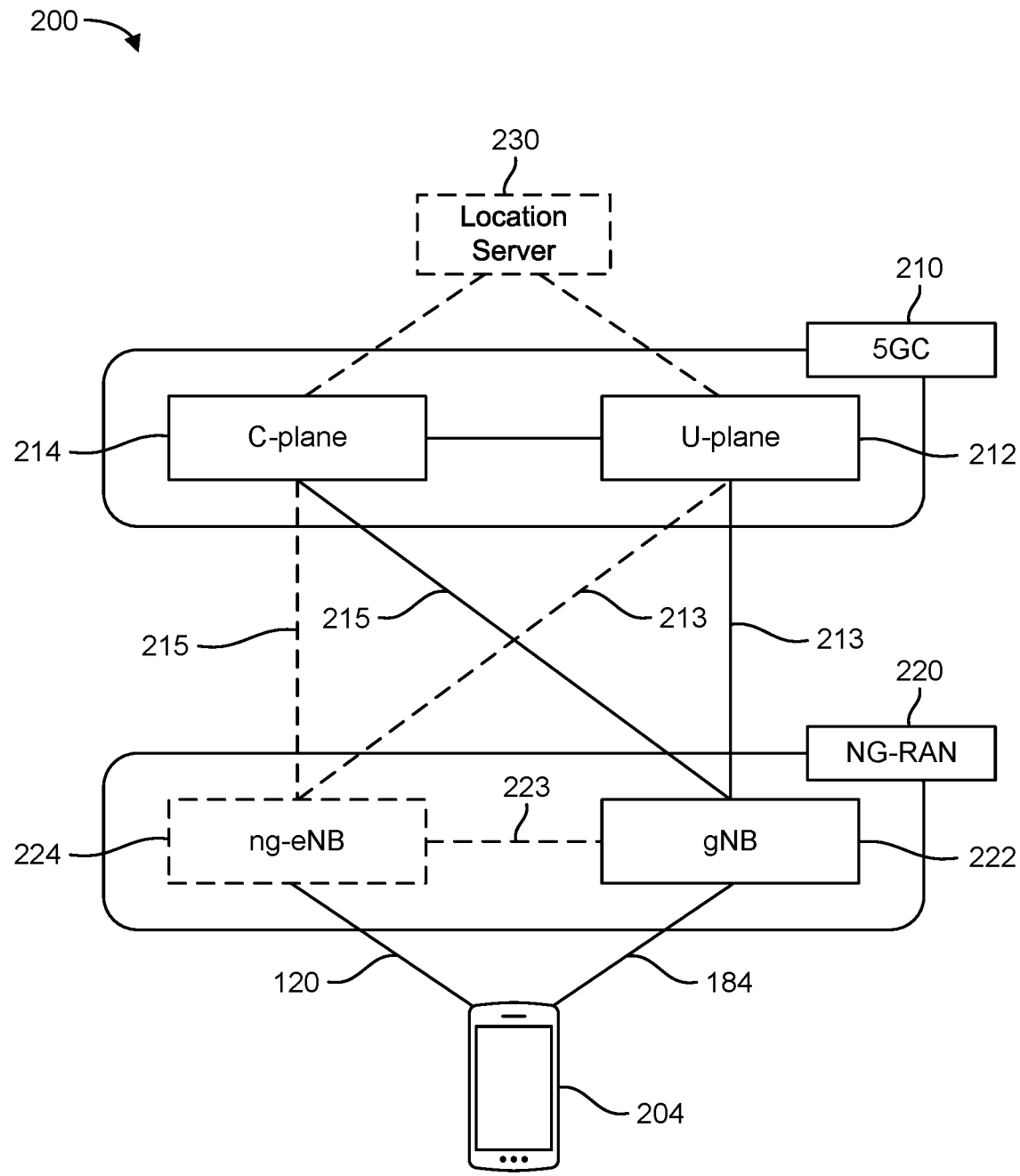
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
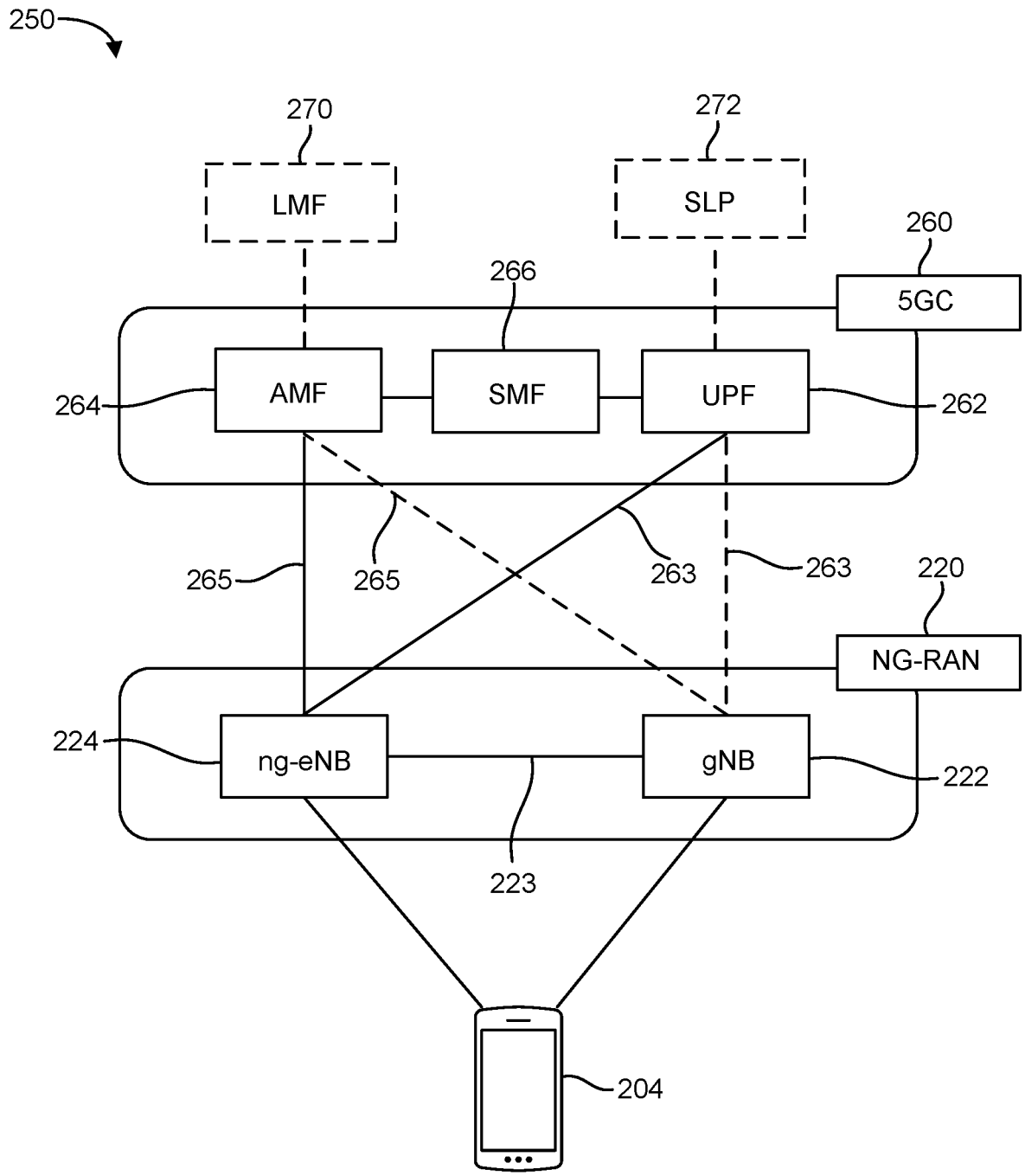

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the NG-RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the NG-RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and an LMF 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Integrated access and backhaul (IAB) technologies have been developed for both LTE and NR. Due to the expected larger bandwidth and faster speeds available for NR compared to LTE (e.g., mmW spectrum), along with the native deployment of massive MIMO or multi-beam systems in NR, there is an increased opportunity to develop and deploy IAB in NR as opposed to LTE. IAB provides an alternative to wired backhaul by extending NR to support, wireless backhaul. As a result, it is possible to use NR for a wireless link from a central location to distributed cell sites and between cell sites. This can simplify the deployment of, for example, small cells (e.g., small cell base station 102' in FIG. 1) and may be useful for temporary deployments for special events or emergency situations. IAB can be used in any frequency band in which NR can operate; however, it is anticipated that mmW spectrum will be the most relevant spectrum for the backhaul link due to the increased capacity. Further, the access link to the UE may operate in either the same frequency hand as the backhaul link (referred to as in-band operation) or by using a separate frequency band (referred to as out-of-band operation). Link adaptation is used to select the frequency band, which reduces interference and maximizes capacity.

Figure 3A:
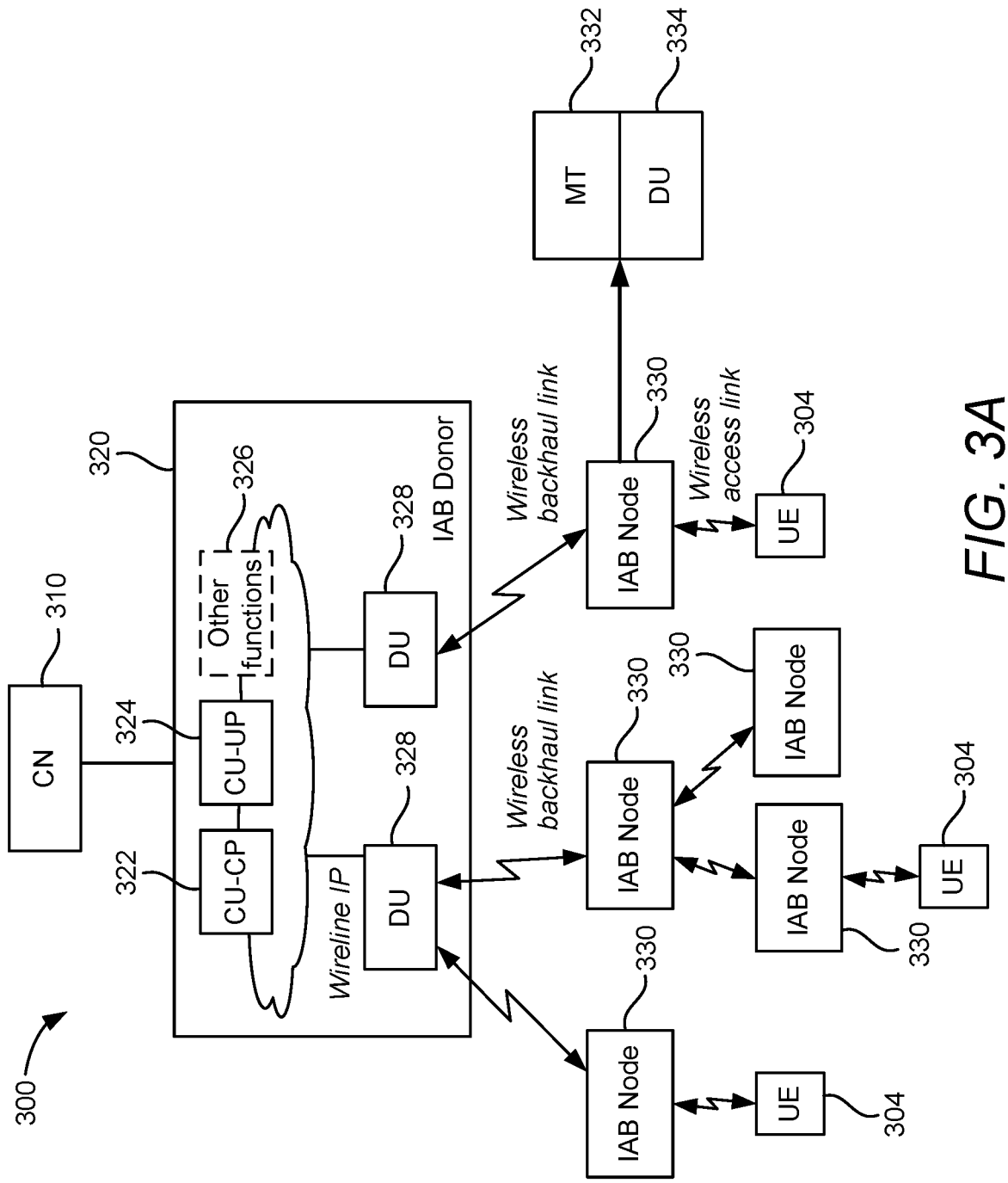
FIG. 3A illustrates an example of an integrated access and backhaul (IAB) network structure, according to aspects of the disclosure.

FIG. 3A illustrates an example of an IAB network structure 300, according to aspects of the disclosure. The IAB network structure 300 includes a core network (CN) 310 (e.g., 5GC 210 or 260) and at least one IAB donor 320. The IAB donor 320 may be an NG-RAN node (e.g., a gNB or other network entity in the NG RAN 220) that provides a same interface to the core network 310 as other non-IAB NG-RAN nodes (e.g., gNBs) and provides wireless backhaul functionality to downstream IAB nodes 330. The IAB donor 320 includes a central unit control plane (CU-CP) function 322, a central unit user plane (CU-UP) function 324, and other optional functions 326. These various functions are connected to one or more distributed units (DUs), also referred to as IAB donor-DUs, 328 (two in the example of FIG. 3A) over wireline IP links. The DUs 328 of the IAB donor 320 support NR wireless backhaul access to one or more IAB nodes 330 using an RF interface that is typically a subset of the NR interface supported by a gNB-DU to support access by a UE. The links between the DUs 328 and the IAB nodes 330 provide backhaul connectivity over a wireless link, and thus, as shown in FIG. 3A, are referred to as "wireless backhaul links."

An IAB node 330 includes a DU 334 (also referred to as an IAB-DU 334) that supports NR radio access from child nodes (e.g., UEs 304 and/or other IAB nodes 330) in the same way as that supported by a gNB-DU or IAB donor-DU. The IAB node 330 also includes a mobile termination (MT) 332 that accesses its parent node using NR (e.g., accesses the DU 334 of another IAB node 330 or a DU 328 of the IAB donor 320). The DU 334 of an IAB node 330 may support one or more cells of its own and appears as a normal base station to UEs 304 (e.g., any of the UEs described herein) and/or appears as an IAB donor-DU to the MTs 332 of other IAB nodes 330 connecting to it. The links between the DU 334 of a parent IAB node 330 and its child nodes (e.g., UEs 304 and/or the MTs 332 of other IAB nodes 330) provide network access over a wireless link, and thus, as shown in FIG. 3A, are referred to as "wireless access links." Referring to FIG. 1, the small cell base station 102' may be an IAB node 330 and the macro cell base station 102 to which it is connected may be an IAB donor 320.

Connecting an IAB node 330 to the network may use the same initial access mechanism (e.g., a random-access procedure) as a UE 304. Once connected, an IAB node 330 receives necessary configuration data from the IAB donor 320. Additional child IAB nodes 330 can connect to the network through the cell(s) created by a parent IAB node 330, thereby enabling multi-hop wireless backhauling.

Figure 3B:
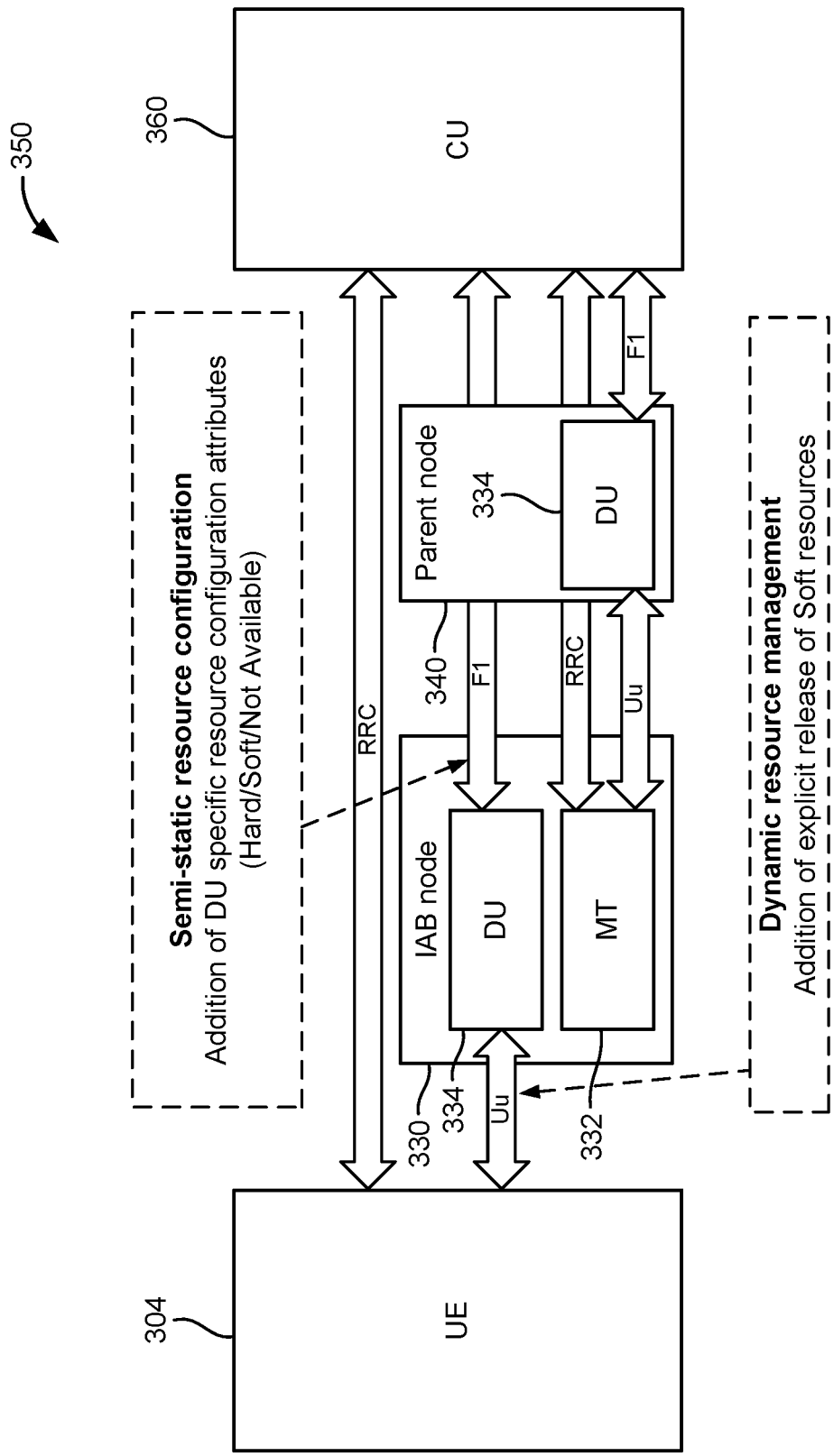
FIG. 3B is a diagram of an example IAB resource management framework, according to aspects of the disclosure.

FIG. 3B is a diagram of an example IAB resource management framework 350, according to aspects of the disclosure. FIG. 3B illustrates a CU 360 belonging to an IAB donor (not shown in FIG. 3B), a parent node 340, an IAB node 330, and a UE 304. The CU 360 may correspond to one or both of the CU-CP 322 and CU-UP 324 in FIG. 3A. The parent node 340 may be any IAB node 330 having a child IAB node 330. The IAB node 330 includes a DU 334 and an MT 332. The parent node 340 also includes a DU 334 and an MT 332, but for simplicity, only the DU 334 is shown.

The CU 360 is a logical node that includes the base station functions of transferring user data, mobility control, radio access network sharing, positioning, session management, and the like, except for those functions allocated exclusively to the DU(s) 328 (not shown in FIG. 3B). More specifically, the CU 360 intercepts and supports the radio resource control (RRC) and packet data convergence protocol (PDCP) layers of a base station, while the DU(s) 328 intercepts and supports the radio link control (RLC), medium access control (MAC), and physical (PHY) layers of the base station. Thus, as shown in FIG. 3B, the UE 304 and the CU 360 communicate at a control plane level via a Radio Resource Control (RRC) protocol layer, whereas the UE 304 and the DU 334 of the IAB node 930 communicate over the Uu interface (the air interface between a UE and a base station).

Because the IAB node 330 (specifically, the MT 332) acts similarly to a UE in its interaction with the parent node 340 (specifically, the DU 334), the MT 332 of the IAB node 330 can also communicate with the CU 360 via the RRC layer and with the DU 334 of the parent node 340 over the Uu interface (because the link between the IAB node 330 and its parent node 340 is a wireless backhaul link). However, the respective DUs 334 of the IAB node 330 and parent node 340 communicate with the CU 360 over a wireless fronthaul interface referred to as the "F1-AP" or "F1" interface. The DUs 334 obtain an IP address for F1-C (F1 control plane) and F1-U (F1 user plane) traffic from the CU 360. Any F1 traffic (F1-C and F1-U) from the DU 334 of an IAB node 330 terminates at the CU 360.

In the IAB resource management framework 350, resource and slot format definitions remain compatible with legacy UEs (e.g., non-NR UEs or older NR UEs). The focus is on the half-duplex constraint and time division multiplexing (TDM) operation between the DU 334 and the MT 332. Another difference is that additional resource attributes are defined for, and visible to, the DU 334 for semi-static resource configuration. Specifically, the additional attributes include Hard, Soft, and Not Available designations. A "Hard" designation indicates that the resource can be assumed to be used by the DU 334. A "Not Available" designation indicates that the resource cannot be used by the DU 334. A "Soft" designation indicates that by default the resource cannot be used by the DU 334. Rather, it can be assumed to be used only if (a) the parent node 340 explicitly releases it, or (b) if the IAB node 330 can determine that it does not impact the operation of its MT 332. Thus, as shown in FIG. 3B, the dynamic resource management between the IAB node 330 and the UE 304 includes the additional functionality/signaling of explicit releases for Soft resources.

Figure 4A:
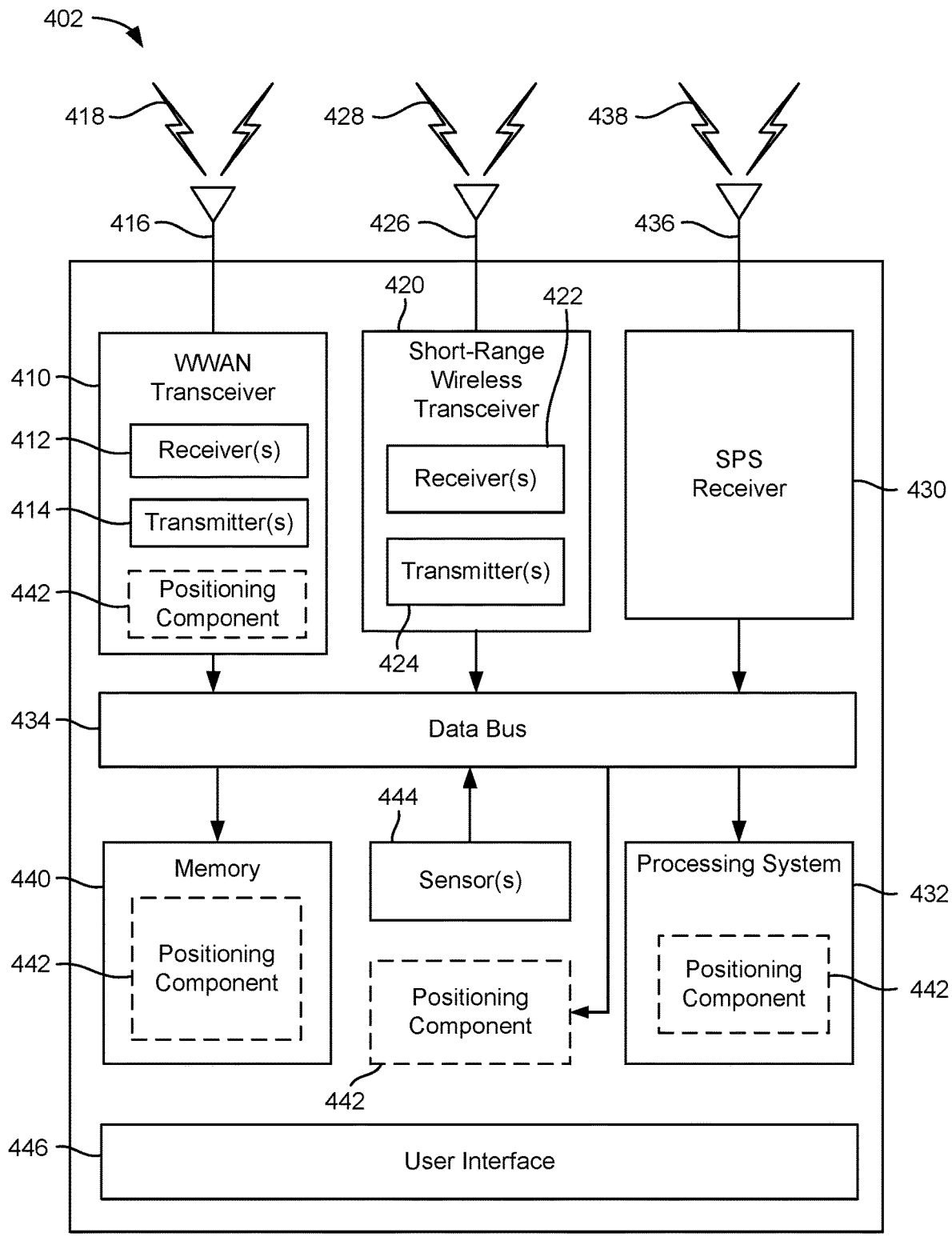
FIGS. 4A to 4C are simplified block diagrams of several sample aspects of components that may be employed in a user equipment (UE), a base station, and a network entity, respectively, and configured to support communications as taught herein.
Figure 4B:
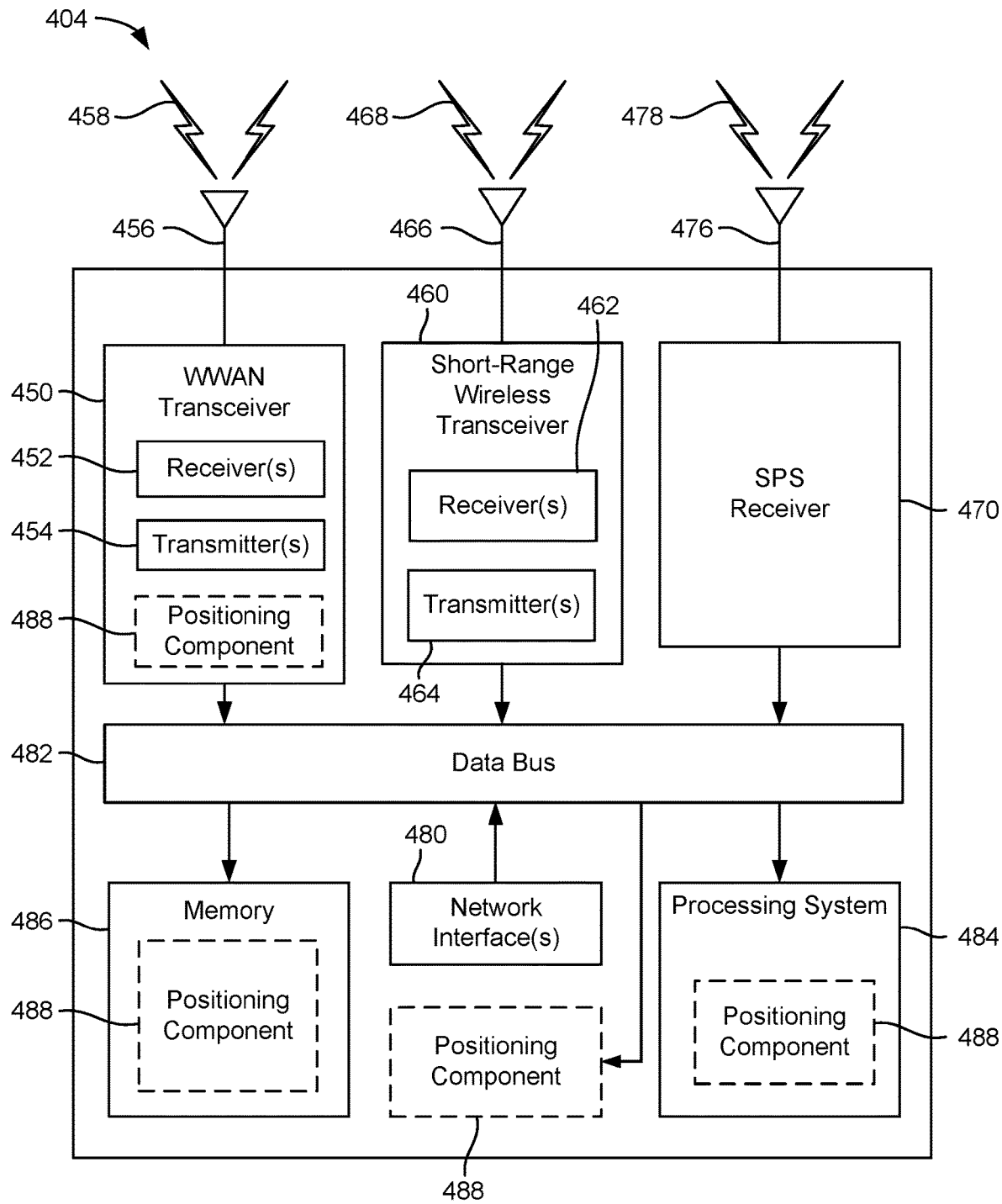
Figure 4C:
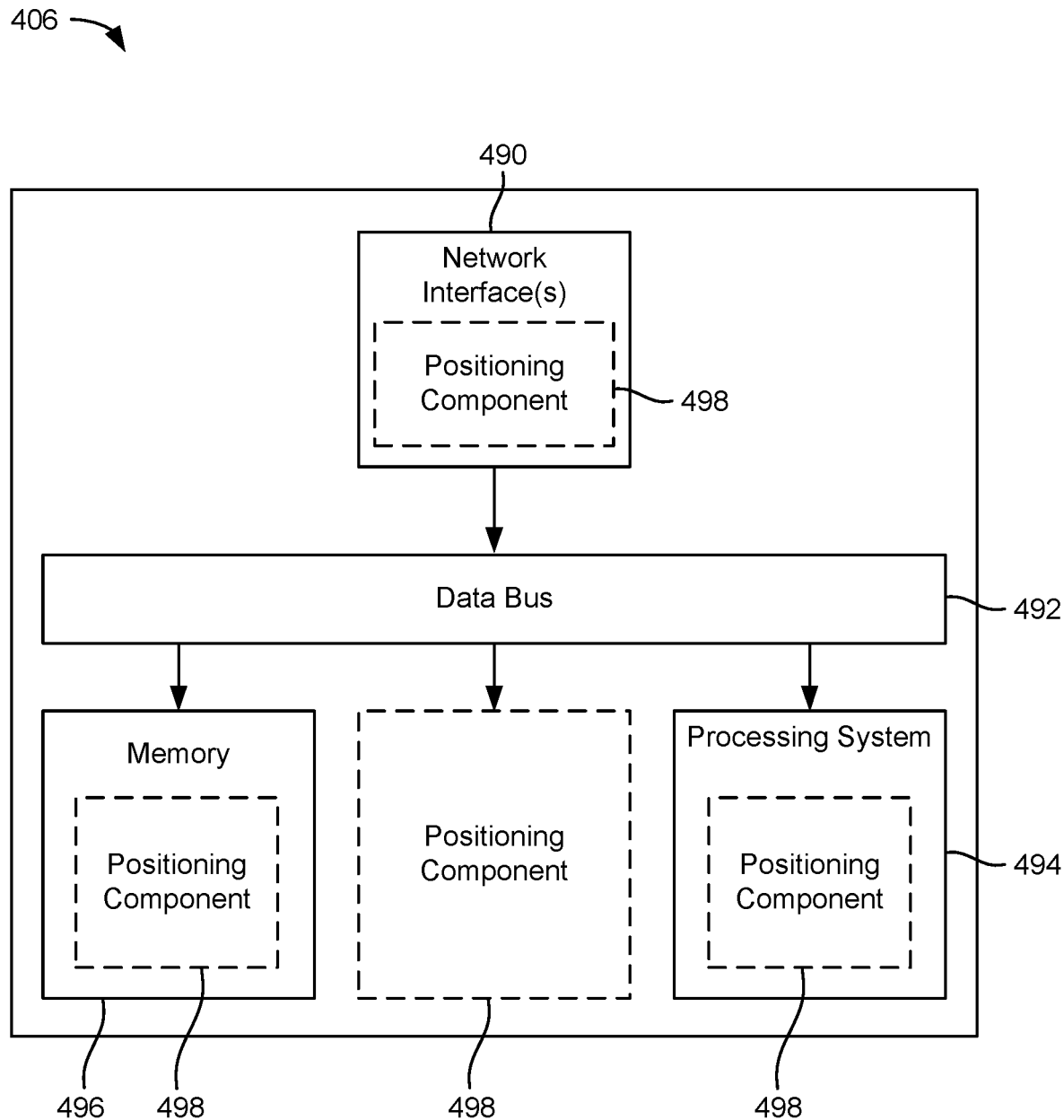

FIGS. 4A, 4B, and 4C illustrate several example components (represented by corresponding blocks) that may be incorporated into a UE 402 (which may correspond to any of the UEs described herein), a base station 404 (which may correspond to any of the base stations described herein), and a network entity 406 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 402 and the base station 404 each include wireless wide area network (WWAN) transceiver 410 and 450, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 410 and 450 may be connected to one or more antennas 416 and 456, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 410 and 450 may be variously configured for transmitting and encoding signals 418 and 458 (e.g., messages, indications, information, and so on), respectively, and, conversely, for receiving and decoding signals 418 and 458 (e.g., messages, indications, information, pilots, and so on), respectively, in accordance with the designated RAT. Specifically, the WWAN transceivers 410 and 450 include one or more transmitters 414 and 454, respectively, for transmitting and encoding signals 418 and 458, respectively, and one or more receivers 412 and 452, respectively, for receiving and decoding signals 418 and 458, respectively.

The UE 402 and the base station 404 also include, at least in some cases, one or more short-range wireless transceivers 420 and 460, respectively. The short-range wireless transceivers 420 and 460 may be connected to one or more antennas 426 and 466, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 420 and 460 may be variously configured for transmitting and encoding signals 428 and 468 (e.g., messages, indications, information, and so on), respectively, and, conversely, for receiving and decoding signals 428 and 468 (e.g., messages, indications, information, pilots, and so on), respectively, in accordance with the designated RAT. Specifically, the short-range wireless transceivers 420 and 460 include one or more transmitters 424 and 464, respectively, for transmitting and encoding signals 428 and 468, respectively, and one or more receivers 422 and 462, respectively, for receiving and decoding signals 428 and 468, respectively. As specific examples, the short-range wireless transceivers 420 and 460 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication interface (also referred to as a communication component) in some implementations, may comprise a separate transmitter device and a separate receiver device in some implementations, or may be embodied in other ways in other implementations. In an aspect, a transmitter may include or be coupled to a plurality of antennas (e.g., antennas 416, 426, 456, 466), such as an antenna array, that permits the respective apparatus to perform transmit "beamforming," as described herein. Similarly, a receiver may include or be coupled to a plurality of antennas (e.g., antennas 416, 426, 456, 466), such as an antenna array, that permits the respective apparatus to perform receive beamforming, as described herein. In an aspect, the transmitter and receiver may share the same plurality of antennas (e.g., antennas 416, 426, 456, 466), such that the respective apparatus can only receive or transmit at a given time, not both at the same time. A wireless communication interface (also referred to as a communication component (e.g., one or both of the transceivers 410 and 420 and/or 450 and 460) of the UE 402 and/or the base station 404 may also comprise a network listen module (NLM) or the like for performing various measurements.

The UE 402 and the base station 404 also include, at least in some cases, satellite positioning systems (SPS) receivers 430 and 470. The SPS receivers 430 and 470 may be connected to one or more antennas 436 and 476, respectively, and may provide means for receiving and/or measuring SPS signals 438 and 478, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 430 and 470 may comprise any suitable hardware and/or software for receiving and processing SPS signals 438 and 478, respectively. The SPS receivers 430 and 470 request information and operations as appropriate from the other systems, and performs calculations necessary to determine positions of the UE 402 and the base station 404 using measurements obtained by any suitable SPS algorithm.

The base station 404 and the network entity 406 each include at least one network interfaces 480 and 490, respectively, providing means for communicating (e.g., means for transmitting, means for receiving, etc.) with other network entities. For example, the network interfaces 480 and 490 (e.g., one or more network access ports) may be configured to communicate with one or more network entities via a wire-based or wireless backhaul connection. In some aspects, the network interfaces 480 and 490 may be implemented as transceivers configured to support wire-based or wireless signal communication. This communication may involve, for example, sending and receiving messages, parameters, and/or other types of information.

The UE 402, the base station 404, and the network entity 406 also include other components that may be used in conjunction with the operations as disclosed herein. The UE 402 includes processor circuitry implementing a processing system 432 for providing functionality relating to, for example, wireless positioning, and for providing other processing functionality. The base station 404 includes a processing system 484 for providing functionality relating to, for example, wireless positioning as disclosed herein, and for providing other processing functionality. The network entity 406 includes a processing system 494 for providing functionality relating to, for example, wireless positioning as disclosed herein, and for providing other processing functionality. The processing systems 432, 484, and 494 may therefore provide means for processing, such as means for determining, means for calculating, means for receiving, means for transmitting, means for indicating, etc. In an aspect, the processing systems 432, 484, and 494 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 402, the base station 404, and the network entity 406 include memory circuitry implementing memory components 440, 486, and 496 (e.g., each including a memory device), respectively, for maintaining information (e.g., information indicative of reserved resources, thresholds, parameters, and so on). The memory components 440, 486, and 496 may therefore provide means for storing, means for retrieving, means for maintaining, etc. In some cases, the UE 402, the base station 404, and the network entity 406 may include positioning components 442, 488, and 498, respectively. The positioning components 442, 488, and 498 may be hardware circuits that are part of or coupled to the processing systems 432, 484, and 494, respectively, that, when executed, cause the UE 402, the base station 404, and the network entity 406 to perform the functionality described herein. In other aspects, the positioning components 442, 488, and 498 may be external to the processing systems 432, 484, and 494 (e.g., part of a modem processing system, integrated with another processing system, etc.). Alternatively, the positioning components 442, 488, and 498 may be memory modules stored in the memory components 440, 486, and 496, respectively, that, when executed by the processing systems 432, 484, and 494 (or a modem processing system, another processing system, etc.), cause the UE 402, the base station 404, and the network entity 406 to perform the functionality described herein. FIG. 4A illustrates possible locations of the positioning component 442, which may be part of the WWAN transceiver 410, the memory component 440, the processing system 432, or any combination thereof, or may be a standalone component. FIG. 4B illustrates possible locations of the positioning component 488, which may be part of the WWAN transceiver 450, the memory component 486, the processing system 484, or any combination thereof, or may be a standalone component. FIG. 4C illustrates possible locations of the positioning component 498, which may be part of the network interface(s) 490, the memory component 496, the processing system 494, or any combination thereof, or may be a standalone component.

The UE 402 may include one or more sensors 444 coupled to the processing system 432 to provide means for sensing or detecting movement and/or orientation information that is independent of motion data derived from signals received by the WWAN transceiver 410, the short-range wireless transceiver 420, and/or the SPS receiver 430. By way of example, the sensor(s) 444 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 444 may include a plurality of different types of devices and combine their outputs in order to provide motion information. For example, the sensor(s) 444 may use a combination of a multi-axis accelerometer and orientation sensors to provide the ability to compute positions in 2D and/or 3D coordinate systems.

In addition, the UE 402 includes a user interface 446 providing means for providing indications (e.g., audible and/or visual indications) to a user and/or for receiving user input (e.g., upon user actuation of a sensing device such a keypad, a touch screen, a microphone, and so on). Although not shown, the base station 404 and the network entity 406 may also include user interfaces.

Referring to the processing system 484 in more detail, in the downlink, IP packets from the network entity 406 may be provided to the processing system 484. The processing system 484 may implement functionality for an RRC layer, a PDCP layer, an RLC layer, and a MAC layer. The processing system 484 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 454 and the receiver 452 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 454 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams.

Channel estimates from a channel estimator may be used to determine the coding and modulation scheme, as well as for spatial processing. The channel estimate may be derived from a reference signal and/or channel condition feedback transmitted by the UE 402. Each spatial stream may then be provided to one or more different antennas 456. The transmitter 454 may modulate an RF carrier with a respective spatial stream for transmission.

At the UE 402, the receiver 412 receives a signal through its respective antenna(s) 416. The receiver 412 recovers information modulated onto an RF carrier and provides the information to the processing system 432. The transmitter 414 and the receiver 412 implement Layer-1 functionality associated with various signal processing functions. The receiver 412 may perform spatial processing on the information to recover any spatial streams destined for the UE 402. If multiple spatial streams are destined for the UE 402, they may be combined by the receiver 412 into a single OFDM symbol stream. The receiver 412 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 404. These soft decisions may be based on channel estimates computed by a channel estimator. The soft decisions are then decoded and de-interleaved to recover the data and control signals that were originally transmitted by the base station 404 on the physical channel. The data and control signals are then provided to the processing system 432, which implements Layer-3 (L3) and Layer-2 (L2) functionality.

In the uplink, the processing system 432 provides demultiplexing between transport and logical channels, packet reassembly, deciphering, header decompression, and control signal processing to recover IP packets from the core network. The processing system 432 is also responsible for error detection.

Similar to the functionality described in connection with the downlink transmission by the base station 404, the processing system 432 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 404 may be used by the transmitter 414 to select the appropriate coding and modulation schemes, and to facilitate spatial processing. The spatial streams generated by the transmitter 414 may be provided to different antenna(s) 416. The transmitter 414 may modulate an RF carrier with a respective spatial stream for transmission.

The uplink transmission is processed at the base station 404 in a manner similar to that described in connection with the receiver function at the UE 402. The receiver 452 receives a signal through its respective antenna(s) 456. The receiver 452 recovers information modulated onto an RF carrier and provides the information to the processing system 484.

In the uplink, the processing system 484 provides demultiplexing between transport and logical channels, packet reassembly, deciphering, header decompression, control signal processing to recover IP packets from the UE 402. IP packets from the processing system 484 may be provided to the core network. The processing system 484 is also responsible for error detection.

For convenience, the UE 402, the base station 404, and/or the network entity 406 are shown in FIGS. 4A to 4C as including various components that may be configured according to the various examples described herein. It will be appreciated, however, that the illustrated blocks may have different functionality in different designs.

The various components of the UE 402, the base station 404, and the network entity 406 may communicate with each other over data buses 434, 482, and 492, respectively. The components of FIGS. 4A to 4C may be implemented in various ways. In some implementations, the components of FIGS. 4A to 4C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 410 to 446 may be implemented by processor and memory component(s) of the UE 402 (e.g., by execution of appropriate code and/or by appropriate configuration of processor components). Similarly, some or all of the functionality represented by blocks 450 to 488 may be implemented by processor and memory component(s) of the base station 404 (e.g., by execution of appropriate code and/or by appropriate configuration of processor components). Also, some or all of the functionality represented by blocks 490 to 498 may be implemented by processor and memory component(s) of the network entity 406 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 402, base station 404, network entity 406, etc., such as the processing systems 432, 484, 494, the transceivers 410, 420, 450, and 460, the memory components 440, 486, and 496, the positioning components 442, 488, and 498, etc.

In an aspect, the UE 402 and/or the base station 404 may be an IAB node (e.g., IAB node 330). In that case, the UE 402 and/or the base station 404 include network access functionality to which UEs or the MTs of other IAB nodes can connect and backhaul functionality that behaves like a UE towards its parent node (e.g., the DU of another IAB node or an IAB donor). Thus, the WWAN transceiver 410 and/or 450 and/or the short-range wireless transceiver 420 and/or 460 may provide wireless network access to one or more UEs and/or one or more MTs of other IAB nodes. Where the base station 404 is an IAB node, the WWAN transceiver 450, the short-range wireless transceiver 460, and/or the network interface(s) 380 may behave like a UE towards the base station's 402 parent node.

Note that although an IAB node comprises a DU and an MT, and both the DU and MT need their own transmit and receive capabilities, the actual hardware component(s) providing the DU and the MT functionality may be separate or may be shared. For example, the WWAN transceiver 450 may provide DU functionality and the network interface(s) 480 may provide MT functionality, or one WWAN transceiver 450 may provide DU functionality and another WWAN transceiver 450 may provide MT functionality. Alternatively, the same WWAN transceiver 450 may provide both DU and MT functionality. As such, the distinction between the DU and the MT may be a logical partition rather than a physical one.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AOD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AOD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AOA). UL-TDOA is similar to DL-TDOA, but is based on uplink reference signals (e.g., SRS) transmitted by the UE. For UL-AOA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (a base station or a UE) transmits a first RTT related signal (e.g., a PRS or SRS) to a second entity (the other of the UE or base station), which transmits a second RTT related signal (e.g., an SRS or PRS) back to the first entity. Each entity measures the time difference between the time of arrival (ToA) of the received RTT signal and the transmission time of the transmitted RTT signal. This time difference is referred to as a receive time-transmission time difference (Rx-Tx). The Rx-Tx measurement may be made, or may be adjusted, to include only a time difference between nearest subframe boundaries for the received and transmitted signals. Both entities may then send their Rx-Tx measurement to a location server (e.g., an LMF 270), which calculates the round trip propagation time (RTT) between the two entities from the two Rx-Tx measurements (e.g., as the sum of the two Rx-Tx measurements). Alternatively, one entity may send its Rx-Tx measurement to the other entity, which then calculates the RTT. The distance between the two entities can be determined from the RTT and the known signal speed (e.g., the speed of light). For multi-RTT positioning, a UE performs an RTT procedure with multiple base stations to enable its location to be multi-laterated (e.g., trilaterated) based on distances to, and the known locations of, the base stations. RTT and multi-RTT methods can be combined with other positioning techniques, such as UL-AOA and DL-AOD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE, as described below with reference to FIG. 5. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5:
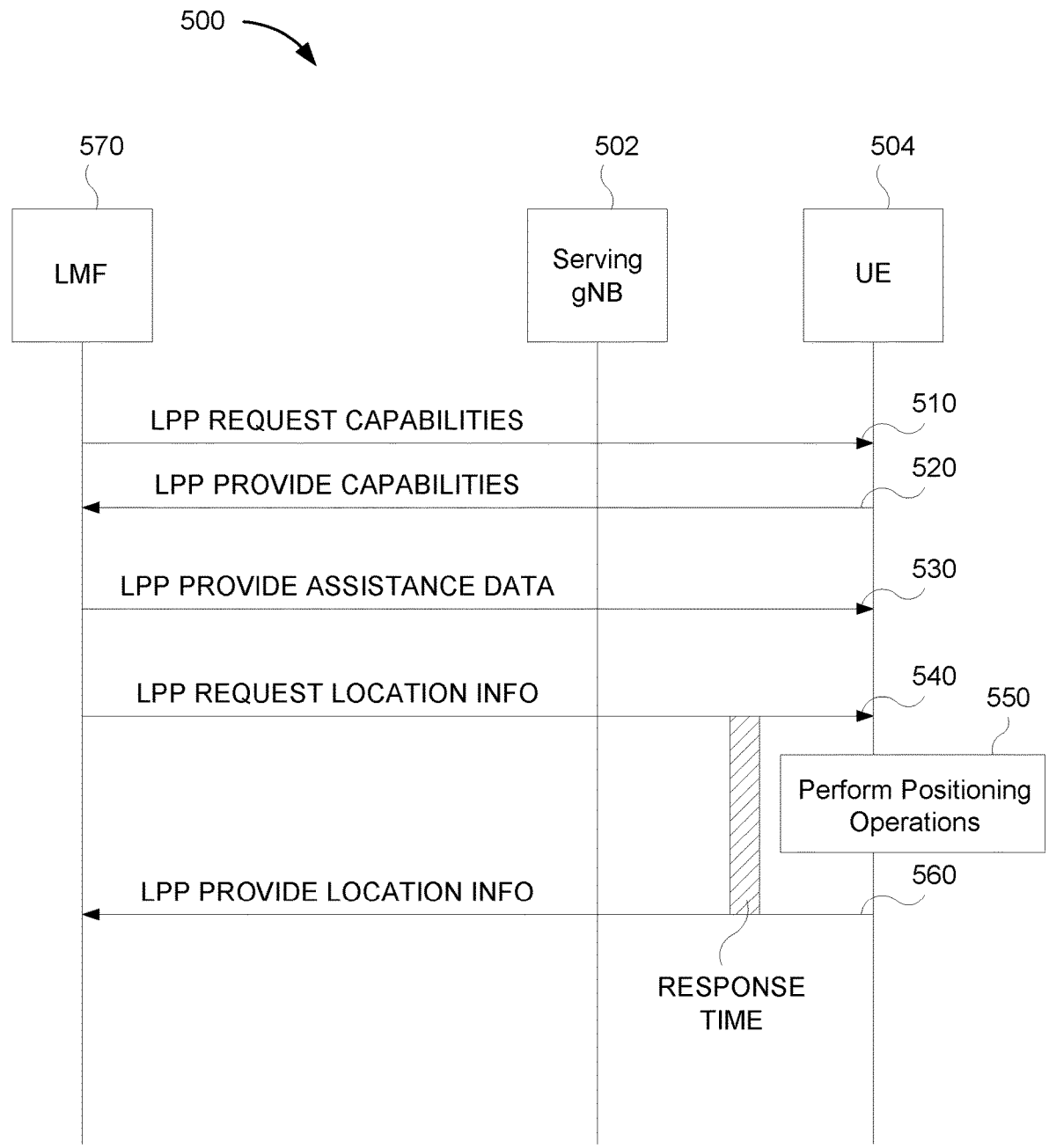
FIG. 5 illustrates an example Long-Term Evolution (LTE) positioning protocol (LPP) call flow between a UE and a location server for performing positioning operations.

FIG. 5 illustrates an example LTE positioning protocol (LPP) procedure 500 between a UE 504 (e.g., any of the UEs described herein) and a location server (illustrated as an LMF 570) for performing positioning operations. As illustrated in FIG. 5, positioning of the UE 504 is supported via an exchange of LPP messages between the UE 504 and the LMF 570. The LPP messages may be exchanged between UE 504 and the LMF 570 via the UE's 505 serving base station (illustrated as a serving gNB 502) and one or more core network nodes (e.g., an AMF 264) (not shown in FIG. 5). The LPP procedure 500 may be used to position the UE 504 in order to support various location-related services, such as navigation for the UE 504 (or for the user of UE 504), or for provision of an accurate location to a public safety answering point (PSAP) in association with an emergency call from UE 504 to a PSAP, or for some other reason. The LPP procedure 500 may also be referred to as a positioning session, and may employ one or more types of positioning methods, such as Downlink (DL) Time Difference of Arrival (DL-TDOA), multi-cell round trip time (multi-RTT), DL Angle of Departure (DL-AOD), enhanced cell ID (E-CID), etc.

Initially, the UE 504 may receive a request for its positioning capabilities from the LMF 570 at stage 510 (e.g., an LPP Request Capabilities message). At stage 520, the UE 504 provides its positioning capabilities to the LMF 570 relative to the LPP protocol by sending an LPP Provide Capabilities message to LMF 570 indicating the position methods and features of these position methods that are supported by the UE 504 using LPP. The capabilities indicated in the LPP Provide Capabilities message may, in some aspects, indicate the type of positioning the UE 504 supports (e.g., DL-TDOA, multi-RTT, E-CID, etc.) and may indicate the capabilities of the UE 504 to support those types of positioning.

Upon reception of the LPP Provide Capabilities message, at stage 520, the LMF 570 determines to use a particular type of positioning method (e.g., DL-TDOA, multi-RTT, E-CID, etc.) based on the indicated type(s) of positioning the UE 504 supports and the capabilities of the LMF 570 and may determine a set of TRPs (a subset of which may be IAB nodes) from which the UE 504 is to measure downlink positioning reference signals (e.g., PRS as defined in LTE and NR) or towards which the UE 504 is to transmit uplink positioning reference signals (e.g., SRS). At stage 530, the LMF 570 sends an LPP Provide Assistance Data message to the UE 504 identifying the set of TRPs.

In some implementations, the LPP Provide Assistance Data message at stage 530 may be sent by the LMF 570 to the UE 504 in response to an LPP Request Assistance Data message sent by the UE 504 to the LMF 570 (not shown in FIG. 5). An LPP Request Assistance Data message may include an identifier of the UE's 504 current serving cell and/or current serving base station and a request for a positioning reference signal configuration of nearby TRPs (which may include IAB nodes).

At stage 540, the LMF 570 sends a request for location information to the UE 504. The request may be an LPP Request Location Information message. This message usually includes information elements defining the requested position methods and/or positioning measurement types, desired accuracy of a location estimate (for UE-based positioning where UE 504 also calculates a location estimate), and a maximum response time (e.g., desired latency).

Note that in some implementations, the LPP Provide Assistance Data message sent at stage 530 may be sent after the LPP Request Location Information message at stage 540 if, for example, the UE 504 sends a request for assistance data to LMF 570 (e.g., in an LPP Request Assistance Data message, not shown in FIG. 5) after receiving the request for location information at stage 540.

At stage 550, the UE 504 utilizes the assistance information received at stage 530 and any additional data (e.g., a desired location accuracy or a maximum response time) received at stage 540 to perform positioning operations (e.g., measurements of DL-PRS, transmission of UL-PRS, etc.) for the selected positioning method.

At stage 560, the UE 504 may send an LPP Provide Location Information message to the LMF 570 conveying the results of any measurements that were obtained at stage 550 (e.g., RSTD, Rx-Tx, etc.) and before or when any maximum response time has expired (e.g., a maximum response time provided by the LMF 570 at stage 540). The LPP Provide Location Information message at stage 560 may also include the time (or times) at which the positioning measurements were obtained and the identity of the TRP(s) from which the positioning measurements were obtained. Note that the time between the request for location information at 540 and the response at 560 is the "response time" and indicates the latency of the positioning session.

The LMF 570 computes an estimated location of the UE 504 using the appropriate positioning techniques (e.g., DL-TDOA, multi-RTT, E-CID, etc.) based, at least in part, on measurements received in the LPP Provide Location Information message at stage 560.

IAB enables the dynamic deployment of multiple cells using massive NR bandwidth that may be available and providing increased network coverage. Since IAB nodes may be densely deployed compared to gNBs, ng-eNBs, and eNBs, IAB can provide additional advantages to a UE for improving the positioning accuracy of various positioning methods. First, there is the benefit of having closer IAB nodes. Due to a dense IAB node deployment, UEs will likely find IAB nodes to be much closer compared to gNBs, ng-eNBs, or eNBs. Moreover, IAB nodes can be relay nodes, which can ensure that network connectivity reaches remote or less accessible locations, such as the corners of a room in a house, inside an office building, and locations (e.g., in a rural area) distant from any gNB, etc. Thus, the use of IAB nodes can ensure that a UE will have better connectivity than could be ensured by gNBs without IAB. PRS measurements for downlink-based (e.g., OTDOA, DL-TDOA, etc.) and/or downlink-and-uplink-based (e.g., multi-RTT) positioning methods can then be more accurate.

A second benefit can be lower power uplink-based positioning (e.g., UL-TDOA). In this case, a UE can use lower power for uplink transmissions (e.g., SRS) if it uses nearby IAB nodes for positioning as opposed to more distant gNBs, due to the reduced distances to IAB nodes compared to distances to gNBs.

A third benefit can be related to a line of sight (LOS) beam for IAB nodes. With dense deployment of IAB nodes, it may be easier and more probable to find an LOS beam for a nearby IAB node than for a gNB. This can improve the positioning accuracy for angle-based (e.g., AOA and AOD) positioning methods.

A fourth benefit can be related to the relative positioning of a mobile UE with respect to a mobile IAB node. In this case, to fill coverage gaps and provide better connectivity, users may have personalized IAB nodes. These personalized IAB nodes may be similar to a mobile WLAN router that a user can carry with them during mobility. For example, there may be a scenario where a user has their personalized IAB node in a bus and all the users in the bus may connect to that IAB node. In this case, the IAB node and the UEs are travelling together, which can ensure that a UE's location will be more accurate if the IAB node's location is known (which may be determined through GPS, other Global Navigation Satellite Systems (GNSSs) or other positioning methods). An AOA/AOD position method can be used to determine if a UE is stationary with respect to the IAB node (along with determining the direction between the UE and the IAB node), and then RTT positioning can be used to determine a distance between the UE and the IAB node, thereby determining the UE's location more accurately. In this scenario, the location server (or other positioning entity) could simply obtain the AOA/AOD and RTT of the UE with respect to the IAB node, and may not require other information with respect to other neighbor cells in order to locate the UE.

Currently, the positioning techniques described above for IAB cannot be implemented because, to support legacy UEs, IAB nodes are currently transparent to a UE and to a location server (e.g., LMF 270). That is, a UE is not aware of whether it is camped on or accessing an IAB node. Similarly, an LMF (e.g., LMF 270) is not aware of IAB nodes because they are managed/controlled by a gNB (specifically the gNB's CU). Thus, neither a UE nor an LMF can make use of IAB nodes to improve positioning accuracy, as described above.

The present disclosure provides techniques for enabling positioning support for IAB nodes. In an IAB scenario, a TRP (or multiple TRPs) of a base station (e.g., a gNB) may correspond to, or be part of, an IAB-DU (e.g., DU 334) or an IAB node (e.g., IAB node 330). An LMF can be aware of the TRPs of a base station, e.g., if an LMF requests and receives TRP-related information from a base station via the New Radio Positioning Protocol A (NRPPa) defined in 3GPP TS 38.455. The existing information for a TRP provided to an LMF by a base station using NRPPa (e.g., provided by an IAB donor 320) may be enhanced with additional parameters to indicate to the LMF the IAB node(s) supported by that base station.

Figure 6:
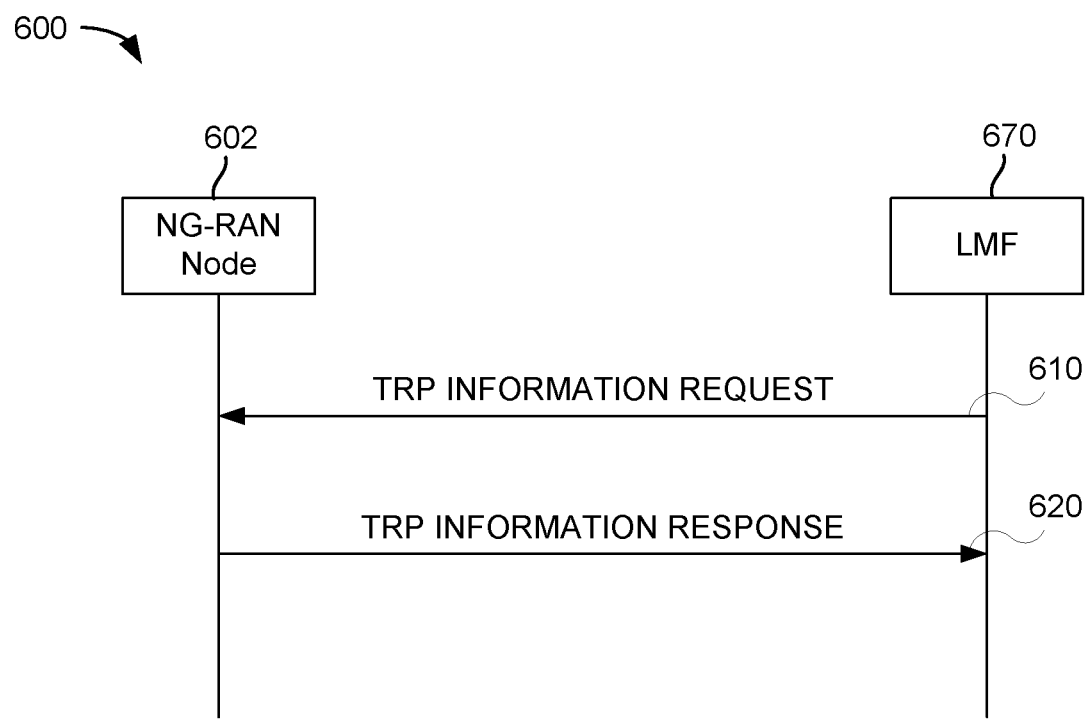
FIG. 6 illustrates an example transmission-reception point (TRP) information exchange procedure, according to aspects of the disclosure.

FIG. 6 illustrates an example TRP information exchange procedure 600, according to aspects of the disclosure. The TRP information exchange procedure 600 is performed between an NG-RAN node 602 (e.g., a gNB or other network entity in the NG-RAN 220 such as JAB Donor 320) and an LMF 670 (e.g., any of the LMFs or location servers described herein). The NG-RAN node 602 and LMF 670 communicate via NRPPa signalling (e.g., which may be exchanged via an AMF 264).

The purpose of the TRP information exchange procedure 600 is to allow the LMF 670 to request the NG-RAN node 602 to provide detailed information for TRPs hosted by the NG-RAN node 602. The LMF 670 initiates the TRP information exchange procedure 600 by sending a TRP INFORMATION REQUEST message (e.g., for NRPPa) at stage 610. The NG-RAN node 602 responds with a TRP INFORMATION RESPONSE message (e.g., for NRPPa) at stage 620 that contains the requested TRP information.

If LMF 670 includes the TRP List information element (IE) in the TRP INFORMATION REQUEST message at stage 610, the NG-RAN node 602 should include the requested information for all TRPs included in the TRP List IE in the TRP INFORMATION RESPONSE message at stage 620. If LMF 670 does not include the TRP List IE in the TRP INFORMATION REQUEST message at stage 610, the NG-RAN node 602 should include the requested information for all TRPs hosted by the NG-RAN node in the TRP INFORMATION RESPONSE message at stage 620.

For each TRP for which the NG-RAN node 602 is reporting information, the NG-RAN node 602 includes a TRP Information IE in the TRP INFORMATION RESPONSE message at stage 620. The TRP Information IE may include one or more of the following parameters: TRP ID, TRP Information Type, PCI, CGI, ARFCN, PRS Configuration, SSB Information, SFN Initialization Time, Spatial Direction Information, and Geographical Coordinates.

As a first parameter that can be requested and/or provided by the above-described TRP information exchange procedure 600, a base station (e.g., NG-RAN node 602) can include an IAB node indicator in its report to the LMF (e.g., TRP INFORMATION RESPONSE message at stage 620). For example, a base station may include a flag (e.g., one bit) to indicate whether a TRP is an IAB node (e.g., indicated by a '1') or a non-IAB node (e.g., indicated by a '0'). With this information, the LMF will know whether a particular TRP is an IAB node (or is part of an IAB node) or not, and can then use this information when selecting TRPs for performing positioning.

A second parameter can be the type of the IAB node, which may be static, semi-static, or mobile. Static IAB nodes are non-mobile, such as those deployed in coffee shops, shopping malls, and other such public locations. Mobile IAB nodes can include drones, vehicles, or other mobile platforms providing IAB node functionality. Semi-static IAB nodes may be moved on occasion from one location to another, such as a home router. A base station (e.g., NG-RAN node 602) can provide (e.g., in the TRP INFORMATION RESPONSE message at stage 620) the type(s) of IAB node(s) it supports to indicate the mobility status of the IAB node(s), thereby enabling that information to be used for positioning purposes. For example, the LMF may prefer to use static IAB nodes rather than semi-static IAB nodes, or may prefer to avoid using mobile IAB nodes for positioning measurements.

A third parameter can be the time and/or frequency accuracy of an IAB node. Time and/or frequency errors are common and can depend on multiple factors, including the hardware components implementing an IAB node. Time and/or frequency corrections may therefore be performed frequently to influence the decoding of a received signal. In an aspect, the base station (e.g., NG-RAN node 602) can provide the time and/or frequency accuracy information of a TRP to the LMF (e.g., in a TRP INFORMATION RESPONSE message at stage 620) to enable the LMF to determine whether a TRP that is (e.g., part of) an IAB node should be considered for positioning measurements. For example, if the time and/or frequency accuracy of the TRP is below a threshold, the LMF can decide not to use it for positioning, or to weight it less in the location estimation.

A fourth parameter can be a downlink time offset between an IAB node (e.g., an IAB node 330 or an IAB-DU 334) and an IAB donor-DU (e.g., IAB donor-DU 328). In an IAB network, there may be a chain of IAB nodes from the CU (e.g., CU 360) and/or the IAB donor-DU (e.g., DU 328). Thus, for each IAB node, there may be a different downlink time offset of each IAB node relative to DUs of the IAB donor, depending on the chain length and the distance from the IAB donor. Accordingly, the base station (the IAB donor) can provide downlink time offset information between the IAB node and the IAB donor-DU to the LMF (e.g., TRP INFORMATION RESPONSE message at stage 620). As the LMF would receive the UE's positioning measurements for DL signals (e.g., PRS) received by the UE from the IAB node (or from an IAB-DU) and might also or instead receive UL measurements from the IAB node (e.g., relative to IAB node or IAB-DU DL timing) of signals (e.g., SRS) transmitted by the UE, the LMF would need information about IAB node (or IAB-DU) transmission timing. This information can be provided by a downlink time offset between the IAB node (or IAB-DU) and the IAB donor-DU combined with information (e.g., absolute timing) of DL transmission timing for an IAB donor-DU. The LMF can use this information to more accurately compute the UE's location. Such information could be particularly useful in computing an RTT between a UE and the IAB node.

In an aspect, the location server (e.g., location server 230, LMF 270, SLP 272) may provide some or all of the above IAB node information to the UE being positioned. The location server can decide which IAB nodes, and which information about those IAB nodes, to provide to the UE. Alternatively, the location server can send all information about nearby IAB nodes to the UE, and the UE can decide whether to consider the associated cells for positioning measurements. For example, the location server can indicate that a specific cell belongs to a mobile IAB node and the UE can determine whether to ignore it. Alternatively, if the UE is mobile and the IAB node is also mobile along with the UE, then the UE may consider it for positioning measurements. The location server can send the relevant parameters to the UE in positioning assistance data (e.g., using LPP, as described above with reference to stage 530 of FIG. 5).

Figure 7:
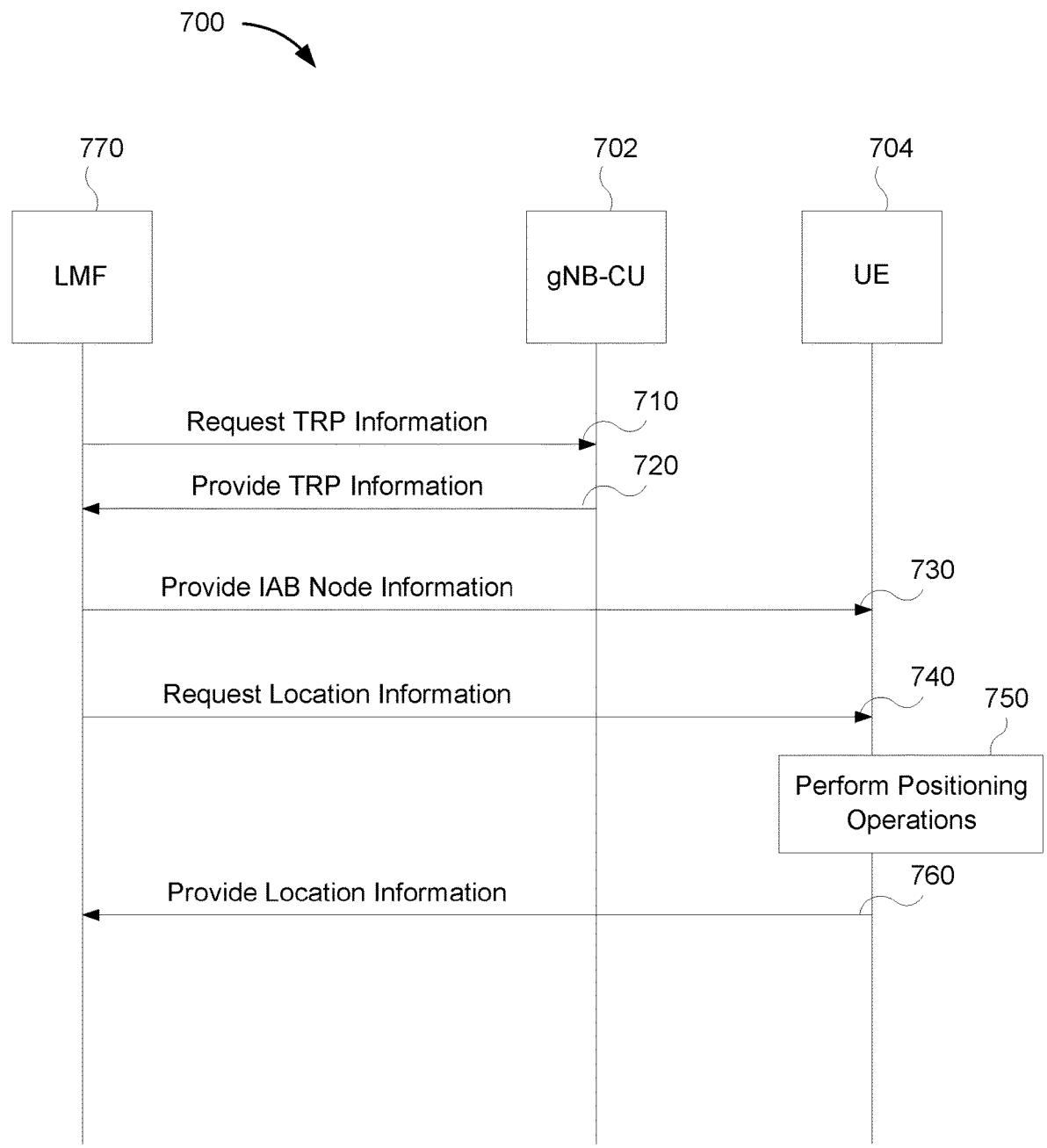
FIG. 7 illustrates an example procedure for using IAB node information for positioning, according to aspects of the disclosure.

FIG. 7 illustrates an example procedure 700 for using IAB node information for positioning, according to aspects of the disclosure. The procedure 700 may be performed between a UE 704 (e.g., any of the UEs described herein), a location server (illustrated as an LMF 770), and the CU of the UE's 704 serving base station (referred to as a "gNB-CU" 702).

At stage 710, the LMF 770 sends a request for TRP information to the gNB-CU 702. The request may be a TRP INFORMATION REQUEST, as at stage 610 of FIG. 6. In an aspect, the request can include an indication (e.g., a one-bit flag) to return information about any IAB nodes associated with the gNB-CU 602. Alternatively or additionally, the request can indicate the specific IAB node parameters (e.g., IAB node indicator, type of the IAB node, time and/or frequency accuracy of the IAB node, downlink time offset) to report.

At stage 720, the gNB-CU 702 provides the requested TRP information. The response may be a TRP INFORMATION RESPONSE message, as at stage 620 of FIG. 6. The response may include the requested IAB node parameters (e.g., IAB node indicator, type of the IAB node, time and/or frequency accuracy of the IAB node, downlink time offset). Alternatively, where the request at 710 does not identify the requested parameters, the gNB-CU 702 can select which (e.g., some or all) IAB node parameters to provide.

At stage 730, the LMF 770 provides IAB node information to the UE 704. The message may be an LPP Provide Assistance Data message, as at stage 530 of FIG. 5. The IAB node information may include some or all of the parameters received at stage 720 (e.g., IAB node indicator, type of the IAB node, time and/or frequency accuracy of the IAB node, downlink time offset). Alternatively, the LMF 770 may simply provide assistance data to the UE 704 that includes some or all of the TRPs identified as IAB nodes, without indicating any additional information about the IAB nodes. For example, the assistance data may not indicate that certain TRPs are IAB nodes, or may indicate that they are, but provide no additional information. The assistance data may further identify which IAB nodes (and other TRPs) are preferred for positioning.

At stage 740, the LMF 770 sends a request for location information to the UE 704. The request may be an LPP Request Location Information message, as at 540 of FIG. 5. In an aspect, the request may identify which IAB nodes (and other TRPs) to use for the associated positioning procedure. Similar to an LPP Request Location Information message, this request may include information elements defining the location information type, desired accuracy of the location estimate, and response time (i.e., desired latency).

Note that in some cases, the IAB node information sent at stage 730 may be sent after the request for location information at 740 if, for example, the UE 704 sends a request for assistance data to the LMF 770 (e.g., in an LPP Request Assistance Data message, not shown in FIG. 7) after receiving the request for location information at stage 740. Alternatively, the LMF 770 may send the IAB node information and the request for location information in the same message.

At stage 750, the UE 704 utilizes the assistance information received at stage 730 and any additional information received at stage 740 to perform positioning operations (e.g., measurements of DL-PRS, transmission of UL-PRS, etc.) for the selected positioning method. This stage may include measuring PRS from one or more IAB nodes identified in the assistance data (stage 730) and/or the location information request (stage 740).

At stage 760, the UE 704 provides location information to the LMF 770 conveying the results of any measurements that were obtained at stage 750 (e.g., ToA, RSTD, Rx-Tx, etc.) and before or when any maximum response time has expired (e.g., a maximum response time provided by the LMF 770 at stage 740). The location information may be in an LPP Provide Location Information message, as at stage 560 of FIG. 5. The location information may also include the time (or times) at which the positioning measurements were obtained and the identity of the TRP(s)/IAB node(s) from which the positioning measurements were obtained.

The LMF 770 can then compute an estimated location of the UE 704 using the appropriate positioning techniques (e.g., DL-TDOA, multi-RTT, E-CID, etc.) based, at least in part, on measurements received in the location information message at stage 760. The measurements may include measurements of one or more IAB nodes, as described above.

Note that the examples illustrated in FIGS. 5 and 7 are for UE-assisted positioning (i.e., a location server calculates an estimate of the UE's location). However, it may be that the UE 504/704 calculates the estimate of its location (referred to as UE-based positioning) based on the assistance data received at stage 530/730. In that case, the UE 770 may include a calculated location estimate at stage 760. Alternatively for UE-based positioning, LMF 570/770 may not send a location information request at stage 540/740 and the UE 504/704 may not report location information to the LMF 570/670 at stage 560/760. Rather, it may report the location to another entity (e.g., a third-party application), display it to the user, use if for a local purpose (e.g., navigation), or the like.

In an aspect, the base station supporting an IAB node (e.g., as one or more TRPs of the base station) may provide a dynamic mobility indication for the IAB node to the LMF to dynamically indicate the mobility status of the IAB node. An IAB node may detect whether it is in motion (for a mobile IAB node) or whether its location has changed (for a semi-static IAB node) through sensors, GPS, or other positioning protocols (e.g., OTDOA/DL-TDOA, etc.). For a mobile IAB node, when there is a change in the IAB node's mobility status (e.g., from static to mobile or vice versa), the supporting base station can indicate the IAB node's current mobility status to the LMF. Similarly, for a semi-static IAB node, when the IAB node's location changes, the supporting base station can indicate the IAB node's updated location to the LMF, and optionally its current mobility status (e.g., if it has changed).

In an aspect, the base station can send this dynamic mobility indication to the LMF through NRPPa signaling. For example, assuming that that the LMF sends a TRP INFORMATION REQUEST (e.g., as at stage 610 of FIG. 6) frequently, the base station can include a dynamic mobility indication in the TRP INFORMATION RESPONSE message, such as transmitted at stage 620. In this case, the TRP INFORMATION RESPONSEs can indicate the dynamic mobility with the new location, as well as the start and end times of the mobility, thereby enabling positioning measurements performed during the mobility period to be ignored or deprioritized. Alternatively, since the mobility indication can be dynamic and a TRP information exchange, as shown in FIG. 6, may not occur with sufficient frequency, the mobility indication may be provided in a separate TRP information message. Note that, as used herein, the terms "TRP information request" and "TRP information response" may refer to the "TRP INFORMATION REQUEST" and "TRP INFORMATION RESPONSE" messages, respectively, described above with reference to FIG. 6, or to other types of TRP information request and response messages.

The LMF can use the updated mobility status of an IAB node to configure the IAB node for positioning measurements. For example, static IAB nodes that are closer to a UE can be given priority for performing positioning measurements. Additionally, the LMF can request the most recent location of a semi-static IAB node and provide it to the UE.

As an example, a given IAB node may have been in a static mobility state when the LMF indicated it in an LPP measurement message to the UE (e.g., an LPP Provide Assistance Data message, as at stage 530 of FIG. 5). However, before the LMF receives the LPP measurement report from the UE (e.g., an LPP Provide Location Information message, as at stage 560 of FIG. 5), it may receive a dynamic mobility indication from the base station supporting the IAB node indicating that the IAB node is now in motion or its location has changed. In response, the LMF can deprioritize the measurement for this IAB node when computing the UE's location.

Figure 8:
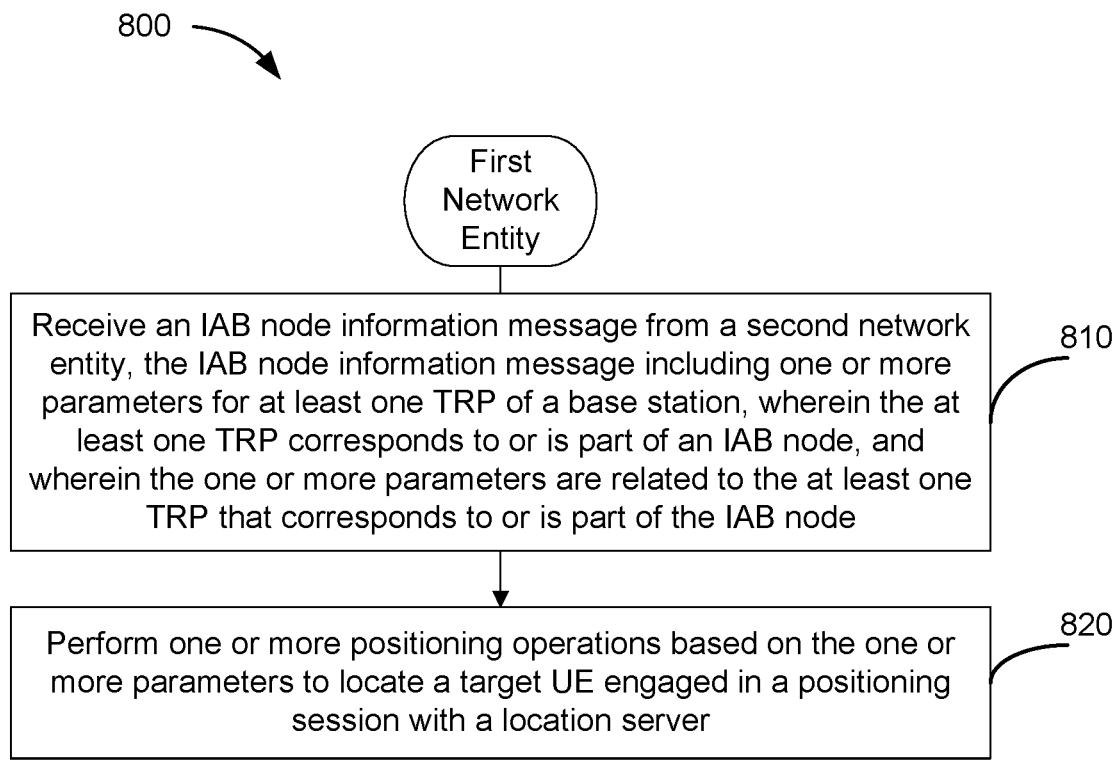
FIGS. 8 and 9 illustrate example methods of communication, according to aspects of the disclosure.

FIG. 8 illustrates an example method 800 of communication, according to aspects of the disclosure. In an aspect, method 800 may be performed by a first network entity (e.g., any of the UEs or location servers described herein).

At 810, the first network entity receives an IAB node information message (e.g., as at stage 730 of FIG. 7, where the first network entity is a UE, or as at stage 720 of FIG. 7, where the first network entity is a location server) from a second network entity (e.g., a location server where the first network entity is a UE, or a base station where the first network entity is a location server). The IAB node information message may include one or more parameters for at least one TRP of a base station (e.g., any of the base stations described herein), where the at least one TRP corresponds to (or is part of) an IAB node, and where the one or more parameters are related to the at least one TRP that corresponds to (or is part of) the IAB node. In an aspect, where the first network entity is a UE, operation 810 may be performed by WWAN transceiver 410, processing system 432, memory component 440, and/or positioning component 442, any or all of which may be considered means for performing this operation. In an aspect, where the first network entity is a location server, operation 810 may be performed by network interface(s) 490, processing system 494, memory component 496, and/or positioning component 498, any or all of which may be considered means for performing this operation.

At 820, the first network entity performs one or more positioning operations based on the one or more parameters to locate a target UE (e.g., any of the UEs described herein) engaged in a positioning session with a location server. In an aspect, where the first network entity is the target UE, operation 820 may be performed by WWAN transceiver 410, processing system 432, memory component 440, and/or positioning component 442, any or all of which may be considered means for performing this operation. In an aspect, where the first network entity is a location server, operation 820 may be performed by network interface(s) 490, processing system 494, memory component 496, and/or positioning component 498, any or all of which may be considered means for performing this operation.

Figure 9:
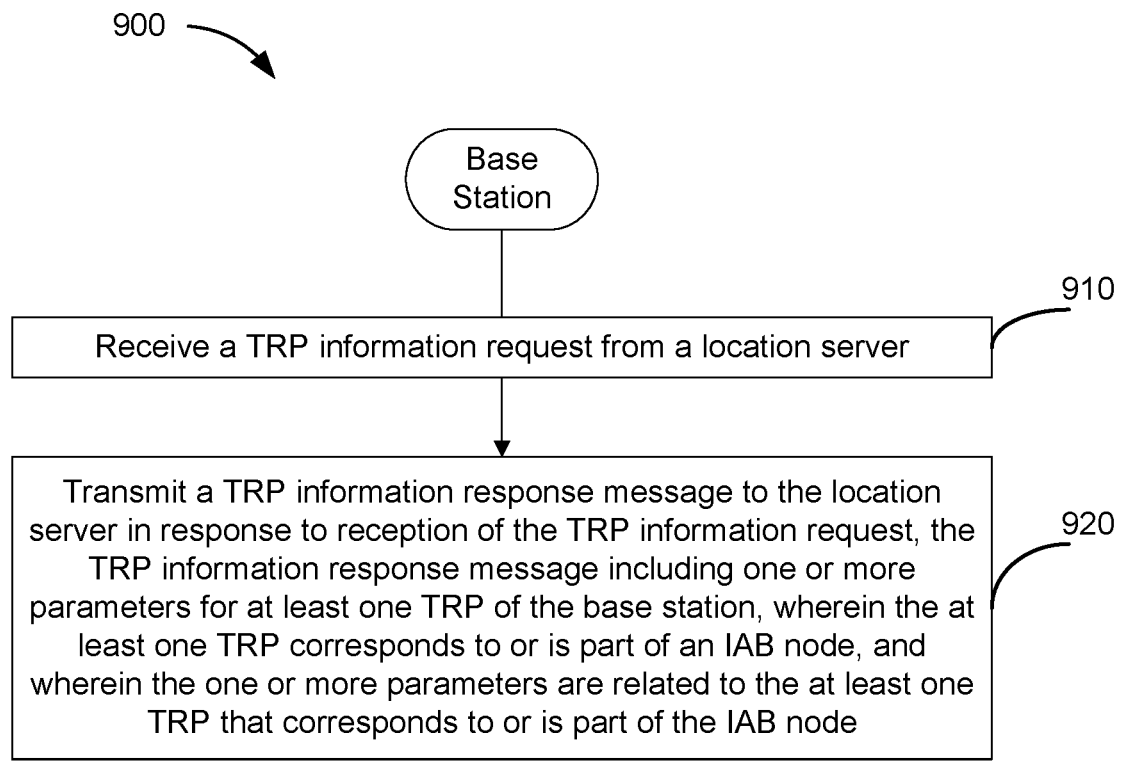

FIG. 9 illustrates an example method 900 of communication, according to aspects of the disclosure. In an aspect, method 900 may be performed by a base station (e.g., any of the base stations described herein).

At 910, the base station receives a TRP information request (e.g., as at stage 710 of FIG. 7) from a location server (e.g., any of the location servers described herein). In an aspect, operation 910 may be performed by WWAN transceiver 450, network interface(s) 480, processing system 484, memory component 486, and/or positioning component 488, any or all of which may be considered means for performing this operation.

At 920, the base station transmits a TRP information response message (e.g., as at stage 720 of FIG. 7) to the location server in response to reception of the TRP information request, the TRP information response message including one or more parameters for at least one TRP of the base station, wherein the at least one TRP corresponds to (or is part of) an IAB node, and wherein the one or more parameters are related to the at least one TRP that corresponds to (or is part of) the IAB node. In an aspect, operation 920 may be performed by WWAN transceiver 450, network interface(s) 480, processing system 484, memory component 486, and/or positioning component 488, any or all of which may be considered means for performing this operation. The location server may use at least one of the one or more parameters to assist location of at least one UE.

As will be appreciated, a technical advantage of the methods 800 and 900 is enabling the use of IAB nodes for more accurate positioning.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of communication performed by a first network entity, comprising: receiving an integrated access and backhaul (IAB) node information message from a second network entity, the IAB node information message including one or more parameters for at least one transmission-reception point (TRP) of a base station, wherein the at least one TRP corresponds to an IAB node, and wherein the one or more parameters are related to the at least one TRP corresponding to the IAB node; and performing one or more positioning operations based on the one or more parameters to locate a target user equipment (UE) engaged in a positioning session with a location server.

Clause 2. The method of clause 1, wherein the one or more parameters include an IAB node indicator indicating that the at least one TRP is the IAB node.

Clause 3. The method of any of clauses 1 to 2, wherein the one or more parameters include an IAB node type indicating a mobility state of the at least one TRP.

Clause 4. The method of clause 3, wherein the mobility state is one of static, semi-static, or mobile.

Clause 5. The method of any of clauses 3 to 4, wherein performing the one or more positioning operations comprises: using the at least one TRP for the one or more positioning operations based on the at least one TRP being in a static or semi-static mobility state.

Clause 6. The method of any of clauses 3 to 5, wherein performing the one or more positioning operations comprises: using the at least one TRP for the one or more positioning operations based on both the at least one TRP and the target UE being in a mobile state.

Clause 7. The method of any of clauses 3 to 6, wherein performing the one or more positioning operations comprises: disregarding the at least one TRP for the one or more positioning operations based on the at least one TRP being in a mobile state.

Clause 8. The method of any of clauses 1 to 7, wherein the one or more parameters include a time and frequency accuracy parameter indicating a time accuracy, a frequency accuracy, or both of the at least one TRP.

Clause 9. The method of clause 8, wherein performing the one or more positioning operations comprises: using the at least one TRP for the one or more positioning operations based on the time accuracy, the frequency accuracy, or both of the at least one TRP being above a threshold.

Clause 10. The method of any of clauses 1 to 9, wherein the one or more parameters include a downlink time offset parameter indicating a downlink time offset between the at least one TRP and an IAB donor associated with the at least one TRP.

Clause 11. The method of any of clauses 1 to 10, wherein the one or more parameters include a dynamic mobility indication indicating whether a mobility state of the at least one TRP has changed.

Clause 12. The method of clause 11, wherein performing the one or more positioning operations comprises: ignoring the at least one TRP for the one or more positioning operations based on the mobility state of the at least one TRP having changed during the positioning session.

Clause 13. The method of any of clauses 1 to 12, wherein: the first network entity is the target UE, the second network entity is the location server, and performing the one or more positioning operations comprises: measuring positioning reference signals transmitted by the at least one TRP based on the one or more parameters; or ignoring positioning reference signals transmitted by the at least one TRP based on the one or more parameters.

Clause 14. The method of any of clauses 1 to 12, wherein: the first network entity is the location server, the second network entity is the base station, and performing the one or more positioning operations comprises transmitting the one or more parameters to the target UE in assistance data for the positioning session.

Clause 15. A method of communication performed by a base station, comprising: receiving a transmission-reception point (TRP) information request from a location server; and transmitting a TRP information response message to the location server in response to reception of the TRP information request, the TRP information response message including one or more parameters for at least one TRP of the base station, wherein the at least one TRP corresponds to an integrated access and backhaul (IAB) node, and wherein the one or more parameters are related to the at least one TRP corresponding to the IAB node.

Clause 16. The method of clause 15, wherein the one or more parameters include an IAB node indicator indicating that the at least one TRP is the IAB node.

Clause 17. The method of any of clauses 15 to 16, wherein the one or more parameters include an IAB node type indicating a mobility state of the at least one TRP.

Clause 18. The method of clause 17, wherein the mobility state is one of static, semi-static, or mobile.

Clause 19. The method of any of clauses 15 to 18, wherein the one or more parameters include a time and frequency accuracy parameter indicating a time accuracy, a frequency accuracy, or both of the at least one TRP.

Clause 20. The method of any of clauses 15 to 19, wherein the one or more parameters include a downlink time offset parameter indicating a downlink time offset between the at least one TRP and an IAB donor associated with the at least one TRP.

Clause 21. The method of any of clauses 15 to 20, wherein the one or more parameters include a dynamic mobility indication indicating whether a mobility state of the at least one TRP has changed.

Clause 22. An apparatus comprising a memory and at least one processor communicatively coupled to the memory, the memory and the at least one processor configured to perform a method according to any of clauses 1 to 21.

Clause 23. An apparatus comprising means for performing a method according to any of clauses 1 to 21.

Clause 24. A non-transitory computer-readable medium storing computer-executable instructions, the computer-executable comprising at least one instruction for causing a computer or processor to perform a method according to any of clauses 1 to 21.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A first network entity, comprising:
    a memory;
    a communication interface; and
    at least one processor communicatively coupled to the memory and the communication interface, the at least one processor configured to:
        receive, via the communication interface, an integrated access and backhaul (IAB) node information message from a second network entity, the IAB node information message including one or more parameters for at least one transmission-reception point (TRP) of a base station, wherein the base station is configured to transmit one or more wireless reference signals to a target user equipment (UE) engaged in a positioning session with a location server, wherein the at least one TRP corresponds to an IAB node, and wherein the one or more parameters are related to the at least one TRP corresponding to the IAB node; and
        perform one or more positioning operations based on the one or more parameters to locate the target UE, wherein:
            (i) the first network entity is the target UE and the second network entity is the location server; or
            (ii) the first network entity is the location server and the second network entity is the base station.

2. The first network entity of claim 1, wherein the one or more parameters include an IAB node indicator indicating that the at least one TRP is the IAB node.

3. The first network entity of claim 1, wherein the one or more parameters include an IAB node type indicating a mobility state of the at least one TRP.

4. The first network entity of claim 3, wherein the mobility state is one of static, semi-static, or mobile.

5. The first network entity of claim 3, wherein the at least one processor being configured to perform the one or more positioning operations comprises the at least one processor being configured to:
    use the at least one TRP for the one or more positioning operations based on the at least one TRP being in a static or semi-static mobility state.

6. The first network entity of claim 3, wherein the at least one processor being configured to perform the one or more positioning operations comprises the at least one processor being configured to:
use the at least one TRP for the one or more positioning operations based on both the at least one TRP and the target UE being in a mobile state.

7. The first network entity of claim 3, wherein the at least one processor being configured to perform the one or more positioning operations comprises the at least one processor being configured to:
disregard the at least one TRP for the one or more positioning operations based on the at least one TRP being in a mobile state.

8. The first network entity of claim 1, wherein the one or more parameters include a time and frequency accuracy parameter indicating a time accuracy, a frequency accuracy, or both of the at least one TRP.

9. The first network entity of claim 8, wherein the at least one processor being configured to perform the one or more positioning operations comprises the at least one processor being configured to:
use the at least one TRP for the one or more positioning operations based on the time accuracy, the frequency accuracy, or both of the at least one TRP being above a threshold.

10. The first network entity of claim 1, wherein the one or more parameters include a downlink time offset parameter indicating a downlink time offset between the at least one TRP and an IAB donor associated with the at least one TRP.

11. The first network entity of claim 1, wherein the one or more parameters include a dynamic mobility indication indicating whether a mobility state of the at least one TRP has changed.

12. The first network entity of claim 11, wherein the at least one processor being configured to perform the one or more positioning operations comprises the at least one processor being configured to:
ignore the at least one TRP for the one or more positioning operations based on the mobility state of the at least one TRP having changed during the positioning session.

13. The first network entity of claim 1, wherein:
the first network entity is the target UE,
the second network entity is the location server, and
the at least one processor being configured to perform the one or more positioning operations comprises the at least one processor being configured to:
measure positioning reference signals transmitted by the at least one TRP based on the one or more parameters; or
ignore positioning reference signals transmitted by the at least one TRP based on the one or more parameters.

14. The first network entity of claim 1, wherein:
the first network entity is the location server,
the second network entity is the base station, and
the at least one processor being configured to perform the one or more positioning operations comprises the at least one processor being configured to cause the communication interface to transmit the one or more parameters to the target UE in assistance data for the positioning session.

15. A base station, comprising:
a memory;
communication interface; and
at least one processor communicatively coupled to the memory and the communication interface, the at least one processor configured to:
receive, via the communication interface, a transmission-reception point (TRP) information request from a location server;
cause the communication interface to transmit a TRP information response message to the location server in response to reception of the TRP information request, the TRP information response message including one or more parameters for at least one TRP of the base station, wherein the at least one TRP corresponds to an integrated access and backhaul (TAB) node, and wherein the one or more parameters are related to the at least one TRP corresponding to the TAB node; and
cause the communication interface to transmit one or more wireless reference signals to a target user equipment (UE) engaged in a positioning session with the location server.

16. The base station of claim 15, wherein the one or more parameters include an TAB node indicator indicating that the at least one TRP is the TAB node.

17. The base station of claim 15, wherein the one or more parameters include an TAB node type indicating a mobility state of the at least one TRP.

18. The base station of claim 17, wherein the mobility state is one of static, semi-static, or mobile.

19. The base station of claim 15, wherein the one or more parameters include a time and frequency accuracy parameter indicating a time accuracy, a frequency accuracy, or both of the at least one TRP.

20. The base station of claim 15, wherein the one or more parameters include a downlink time offset parameter indicating a downlink time offset between the at least one TRP and an IAB donor associated with the at least one TRP.

21. The base station of claim 15, wherein the one or more parameters include a dynamic mobility indication indicating whether a mobility state of the at least one TRP has changed.

22. A method of communication performed by a first network entity, comprising:
receiving an integrated access and backhaul (IAB) node information message from a second network entity, the IAB node information message including one or more parameters for at least one transmission-reception point (TRP) of a base station, wherein the base station is configured to transmit one or more wireless reference signals to a target user equipment (UE) engaged in a positioning session with a location server, wherein the at least one TRP corresponds to an IAB node, and wherein the one or more parameters are related to the at least one TRP corresponding to the IAB node; and
performing one or more positioning operations based on the one or more parameters to locate the target UE, wherein:
(i) the first network entity is the target UE and the second network entity is the location server; or
(ii) the first network entity is the location server and the second network entity is the base station.

23. The method of claim 22, wherein the one or more parameters include an IAB node indicator indicating that the at least one TRP is the IAB node.

24. The method of claim 22, wherein the one or more parameters include an IAB node type indicating a mobility state of the at least one TRP.

25. The method of claim 22, wherein performing the one or more positioning operations comprises:

using the at least one TRP for the one or more positioning operations based on the at least one TRP being in a static or semi-static mobility state;

using the at least one TRP for the one or more positioning operations based on both the at least one TRP and the target UE being in a mobile state; or disregarding the at least one TRP for the one or more positioning operations based on the at least one TRP being in a mobile state.

26. The method of claim 22, wherein the one or more parameters include a time and frequency accuracy parameter indicating a time accuracy, a frequency accuracy, or both of the at least one TRP.

27. The method of claim 22, wherein the one or more parameters include a downlink time offset parameter indicating a downlink time offset between the at least one TRP and an IAB donor associated with the at least one TRP.

28. The method of claim 22, wherein the one or more parameters include a dynamic mobility indication indicating whether a mobility state of the at least one TRP has changed.

29. A method of communication performed by a base station, comprising:

receiving a transmission-reception point (TRP) information request from a location server;

transmitting a TRP information response message to the location server in response to reception of the TRP information request, the TRP information response message including one or more parameters for at least one TRP of the base station, wherein the at least one TRP corresponds to an integrated access and backhaul (TAB) node, and wherein the one or more parameters are related to the at least one TRP corresponding to the TAB node; and transmitting one or more wireless reference signals to a target user equipment (UE) engaged in a positioning session with the location server.

30. The method of claim 29, wherein the one or more parameters include:

an TAB node indicator indicating that the at least one TRP is the TAB node, an TAB node type indicating a mobility state of the at least one TRP, a time and frequency accuracy parameter indicating a time accuracy, a frequency accuracy, or both of the at least one TRP, a downlink time offset parameter indicating a downlink time offset between the at least one TRP and an IAB donor associated with the at least one TRP, a dynamic mobility indication indicating whether a mobility state of the at least one TRP has changed, or any combination thereof.

* * * * *